US012585882B1

(12) United States Patent
Galvin et al.

(10) Patent No.: US 12,585,882 B1
(45) Date of Patent: Mar. 24, 2026

(54) EVOLUTIONARY THOUGHT CACHING FOR MULTI-STAGE LANGUAGE MODEL SYSTEMS

(71) Applicant: AtomBeam Technologies Inc., Moraga, CA (US)

(72) Inventors: Brian Galvin, Silverdale, WA (US); Alan McCord, Forney, TX (US)

(73) Assignee: ATOBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/321,168

(22) Filed: Sep. 5, 2025

Related U.S. Application Data

(63) Continuation-in-part of application No. 19/284,115, filed on Jul. 29, 2025, which is a continuation of
(Continued)

(51) Int. Cl.
*G06F 40/30* (2020.01)
*G06F 16/332* (2019.01)
*G06F 16/3329* (2025.01)

(52) U.S. Cl.
CPC .......... *G06F 40/30* (2020.01); *G06F 16/3325* (2019.01); *G06F 16/3329* (2019.01)

(58) Field of Classification Search
CPC .... G06F 40/211; G06F 40/253; G06F 40/268; G06F 40/284; G06F 40/30; G06N 3/08
See application file for complete search history.

(56) References Cited

U.S. PATENT DOCUMENTS

| | | | | |
|---|---|---|---|---|
| 9,477,783 B2 * | 10/2016 | Barbieri | ................... | G06F 16/78 |
| 10,009,466 B2 * | 6/2018 | Marrelli | ................ | G06F 16/367 |

(Continued)

FOREIGN PATENT DOCUMENTS

| | | | | | |
|---|---|---|---|---|---|
| CN | 110489087 A | * | 11/2019 | ............. | G06F 8/427 |
| CN | 106156083 B | * | 2/2020 | | |

(Continued)

OTHER PUBLICATIONS

Liu et al., title={Think-in-memory: Recalling and post-thinking enable llms with long-term memory}, journal={arXiv preprint arXiv:2311.08719}, 2023, pp. 1-9 (Year: 2023).*

(Continued)

*Primary Examiner* — Lamont M Spooner
(74) *Attorney, Agent, or Firm* — GALVIN PATENT LAW LLC; Brian R. Galvin; Erin L. Johnston

(57) ABSTRACT

A system and method for efficient natural language processing combines large and small language models with a reasoning cache architecture. Input data is processed by a first large language model to generate structured thoughts with associated latent representations, which are cached for future use. Specialized agents perform domain-specific operations on cached thoughts and collaboratively evolve them using genetic algorithms. When new input is received, similar cached or evolved thoughts are retrieved based on latent representation similarity. The input and retrieved thoughts are then routed to a second, smaller language model to generate a response. This architecture reduces computational overhead while preserving response quality, enables reuse of reasoning across sessions and devices, and extends effective context beyond traditional sequence limits. By leveraging prior reasoning, the system minimizes redundant computation and supports scalable deployment across diverse hardware environments.

18 Claims, 20 Drawing Sheets

Related U.S. Application Data application No. 19/051,193, filed on Feb. 12, 2025, now Pat. No. 12,387,050.

(56) References Cited

U.S. PATENT DOCUMENTS

| | | | | |
|---|---|---|---|---|
| 10,083,009 | B2 * | 9/2018 | Gabel | G06F 40/284 |
| 11,973,724 | B2 * | 4/2024 | Sundaravadivel | G06F 40/30 |
| 12,141,527 | B2 * | 11/2024 | Olmstead | G06F 40/295 |
| 12,223,456 | B1 * | 2/2025 | Manohar | G06F 40/30 |
| 12,481,517 | B1 * | 11/2025 | Zhang | G06F 9/45504 |
| 2002/0091801 | A1 * | 7/2002 | Lewin | H04L 63/08 |
| | | | | 709/219 |
| 2005/0197992 | A1 * | 9/2005 | Kipersztok | G06F 40/30 |
| | | | | 706/50 |
| 2015/0363386 | A1 * | 12/2015 | Song | G06F 16/36 |
| | | | | 704/9 |
| 2016/0034305 | A1 * | 2/2016 | Shear | G06F 9/50 |
| | | | | 707/722 |
| 2017/0337287 | A1 * | 11/2017 | Gill | G06Q 10/06311 |
| 2018/0174055 | A1 * | 6/2018 | Tirumale | H04L 51/04 |
| 2019/0174514 | A1 * | 6/2019 | Ramesh | G06Q 10/02 |
| 2020/0034776 | A1 * | 1/2020 | Peran | G06N 5/022 |
| 2020/0034914 | A1 * | 1/2020 | Boss | G06Q 30/0633 |
| 2020/0073983 | A1 * | 3/2020 | Sen | G06F 16/243 |
| 2020/0097554 | A1 * | 3/2020 | Rezagholizadeh | G06F 40/58 |
| 2020/0285704 | A1 * | 9/2020 | Rajani | G06N 3/09 |
| 2020/0336562 | A1 * | 10/2020 | Luft | H04L 67/2885 |
| 2020/0351344 | A1 * | 11/2020 | Das Gupta | H04L 41/16 |
| 2020/0387809 | A1 * | 12/2020 | Banerjee | G06N 20/00 |
| 2021/0073808 | A1 * | 3/2021 | Gu | G06Q 20/3221 |
| 2021/0110306 | A1 * | 4/2021 | Krishnan | G06N 3/094 |
| 2021/0406224 | A1 * | 12/2021 | Neufeld | G06F 16/1873 |
| 2022/0138156 | A1 * | 5/2022 | Wang | H04L 67/568 |
| | | | | 707/740 |
| 2022/0207362 | A1 * | 6/2022 | Meyerson | G06F 17/16 |
| 2023/0316006 | A1 * | 10/2023 | Tunstall-Pedoe | G06N 3/0442 |
| | | | | 704/9 |
| 2023/0362091 | A1 * | 11/2023 | Michaud | H04L 45/42 |
| 2023/0365138 | A1 * | 11/2023 | Park | G10L 15/1822 |
| 2024/0095460 | A1 * | 3/2024 | Xu | G06F 40/30 |
| 2024/0104391 | A1 * | 3/2024 | Higgins | G06F 16/3329 |
| 2024/0160955 | A1 * | 5/2024 | Zhao | G06F 16/3329 |
| 2024/0176805 | A1 * | 5/2024 | Liu | G06F 40/295 |
| 2024/0256965 | A1 * | 8/2024 | Chung | G06N 20/00 |
| 2024/0303496 | A1 * | 9/2024 | Nair | G06N 3/0895 |
| 2024/0338393 | A1 * | 10/2024 | Malon | G06F 16/3323 |
| 2024/0354320 | A1 * | 10/2024 | Procter | G06F 40/103 |
| 2024/0386015 | A1 * | 11/2024 | Crabtree | G06F 16/9024 |
| 2024/0406166 | A1 * | 12/2024 | Bell | G06N 3/045 |
| 2024/0411809 | A1 * | 12/2024 | Najafirad | G06F 16/7837 |
| 2024/0419905 | A1 * | 12/2024 | Mai | G06N 20/00 |
| 2024/0428008 | A1 * | 12/2024 | Abraham | G06F 40/35 |
| 2025/0028882 | A1 * | 1/2025 | Ataei | G06F 30/12 |
| 2025/0094455 | A1 * | 3/2025 | Bista | G06F 16/3329 |
| 2025/0148203 | A1 * | 5/2025 | Pan | G10L 15/26 |
| 2025/0156684 | A1 * | 5/2025 | Liu | G06N 3/0455 |
| 2025/0165718 | A1 * | 5/2025 | Seo | G06F 40/30 |
| 2025/0191369 | A1 * | 6/2025 | Huang | G06F 40/284 |
| 2025/0225160 | A1 * | 7/2025 | Heisler | G06F 16/3329 |
| 2025/0232322 | A1 * | 7/2025 | Batts | G06Q 30/0201 |
| 2025/0259041 | A1 * | 8/2025 | Crabtree | G06N 3/042 |
| 2025/0259042 | A1 * | 8/2025 | Crabtree | G06N 3/047 |
| 2025/0259043 | A1 * | 8/2025 | Crabtree | G06N 3/042 |
| 2025/0259044 | A1 * | 8/2025 | Crabtree | G06N 3/042 |
| 2025/0259082 | A1 * | 8/2025 | Crabtree | G06N 3/042 |
| 2025/0259085 | A1 * | 8/2025 | Crabtree | G06N 5/01 |
| 2025/0307672 | A1 * | 10/2025 | Esencan | G06N 5/04 |
| 2025/0342344 | A1 * | 11/2025 | Gao et al. | G06N 3/0455 |
| 2025/0348707 | A1 * | 11/2025 | Myers | G06F 8/443 |
| 2025/0349407 | A1 * | 11/2025 | Crabtree | A61B 34/30 |
| 2025/0378385 | A1 * | 12/2025 | Koh | G06N 3/006 |
| 2025/0390352 | A1 * | 12/2025 | Crabtree | G06F 9/5027 |

FOREIGN PATENT DOCUMENTS

| | | | | | |
|---|---|---|---|---|---|
| CN | 113255364 | A | * | 8/2021 | G06F 16/367 |
| CN | 113590836 | A | * | 11/2021 | G06F 40/169 |
| CN | 114020885 | A | * | 2/2022 | G06F 16/3334 |
| CN | 114509825 | A | * | 5/2022 | G06F 18/214 |
| CN | 115525768 | A | * | 12/2022 | G06N 5/02 |
| CN | 114818740 | B | * | 3/2023 | G06F 16/35 |
| CN | 116775846 | A | * | 9/2023 | |
| CN | 116795958 | A | * | 9/2023 | G06F 16/3329 |
| CN | 116860987 | A | * | 10/2023 | G06F 16/367 |
| CN | 117056524 | A | * | 11/2023 | G06F 16/367 |
| CN | 117435923 | A | * | 1/2024 | G06F 18/214 |
| CN | 117557425 | A | * | 2/2024 | G06Q 50/205 |
| CN | 117610586 | A | * | 2/2024 | G06F 40/58 |
| CN | 117667918 | A | * | 3/2024 | G06Q 50/06 |
| CN | 118052289 | A | * | 5/2024 | G06N 5/022 |
| CN | 118211649 | A | * | 6/2024 | G06N 3/0455 |
| CN | 118296115 | A | * | 7/2024 | G06F 40/295 |
| CN | 114880429 | B | * | 8/2024 | G06F 16/367 |
| CN | 118611907 | A | * | 9/2024 | G06N 3/126 |
| CN | 118657201 | A | * | 9/2024 | G06N 5/04 |
| CN | 118821800 | A | * | 10/2024 | G06F 18/27 |
| CN | 118964538 | A | * | 11/2024 | G06N 5/041 |
| CN | 119005308 | A | * | 11/2024 | G06N 3/0455 |
| CN | 119179786 | A | * | 12/2024 | G06F 16/338 |
| CN | 119336900 | A | * | 1/2025 | G06F 40/284 |
| CN | 119443288 | A | * | 2/2025 | G06F 18/25 |
| CN | 119539026 | A | * | 2/2025 | G06N 3/045 |
| CN | 119918654 | A | * | 5/2025 | |
| CN | 119988690 | A | * | 5/2025 | |
| CN | 120030114 | A | * | 5/2025 | G06F 16/367 |
| CN | 119150237 | B | * | 6/2025 | G06N 5/041 |
| CN | 120163226 | A | * | 6/2025 | G06N 5/043 |
| CN | 120298880 | A | * | 7/2025 | G06N 3/08 |
| CN | 120670651 | A | * | 9/2025 | G06N 3/045 |
| GB | 2563183 | A | * | 12/2018 | G05B 19/41865 |
| JP | H04205030 | A | * | 7/1992 | |
| KR | 20160121997 | A | * | 10/2016 | G06F 17/30327 |
| KR | 102721100 | B1 | * | 10/2024 | G06N 3/0455 |
| KR | 20240157317 | A | * | 11/2024 | G06N 5/022 |
| TW | 202526694 | A | * | 7/2025 | |
| WO | WO-2023200762 | A1 | * | 10/2023 | G06F 40/103 |
| WO | WO-2025100557 | A1 | * | 5/2025 | G06F 40/40 |
| WO | WO-2025136527 | A1 | * | 6/2025 | G06N 3/09 |

OTHER PUBLICATIONS

Gao, Hang & Zhang, Yongfeng; "Memory Sharing for Large Language Model Based Agents", arXiv:2404.09982v2, Jul. 5, 2024.

Ramirez, Guillem, et al; "Cache & Distil: Optimising API Calls to Large Language Models", arXiv:2310.13561v1, Oct. 20, 2023.

Schroeder, Luis Gaspar; "VectorQ: Advanced Semantic Prompt Caching with Dynamic Thresholds and Performance-Based Clustering", Technical University of Munich, Nov. 26, 2024.

* cited by examiner

Supervisor
360

Cache Manager
630

Thought Selector
640

Sync Controller
650

Quality Assessor
660

Router
310

Prompt Analyzer
600

Cache Query Interface
610

Model Selector
620

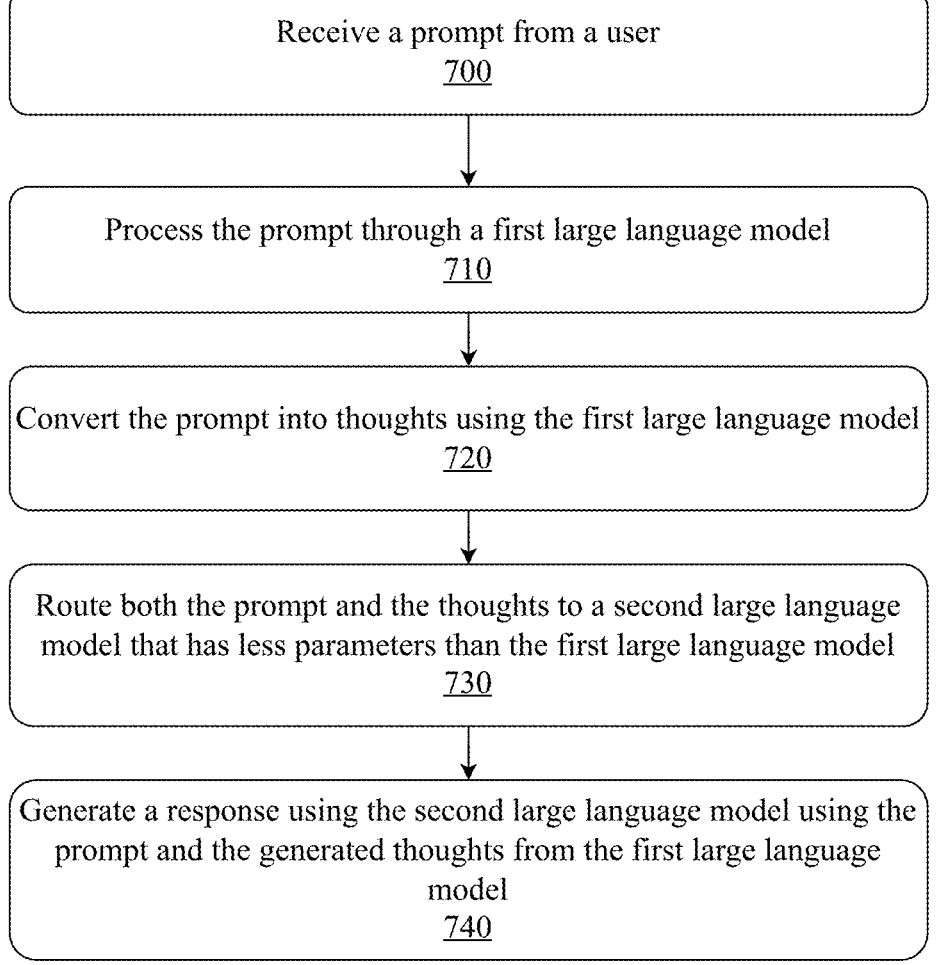

Receive a prompt from a user
700

Process the prompt through a first large language model
710

Convert the prompt into thoughts using the first large language model
720

Route both the prompt and the thoughts to a second large language model that has less parameters than the first large language model
730

Generate a response using the second large language model using the prompt and the generated thoughts from the first large language model
740

FIG. 7

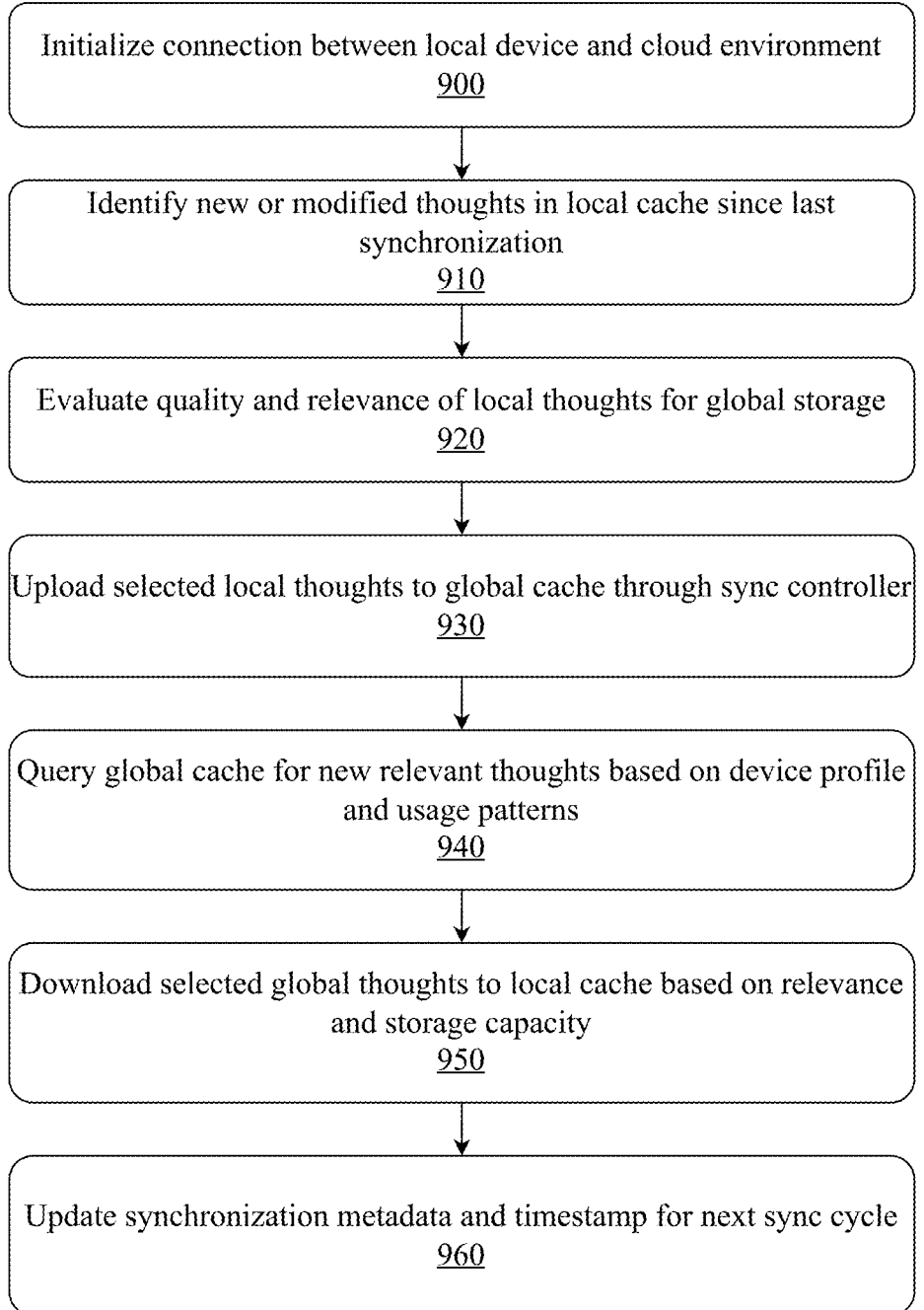

Initialize connection between local device and cloud environment
900

Identify new or modified thoughts in local cache since last
synchronization
910

Evaluate quality and relevance of local thoughts for global storage
920

Upload selected local thoughts to global cache through sync controller
930

Query global cache for new relevant thoughts based on device profile
and usage patterns
940

Download selected global thoughts to local cache based on relevance
and storage capacity
950

Update synchronization metadata and timestamp for next sync cycle
960

FIG. 9

Multi-Agent Language Model System with Evolutionary Thought Caching 1100

EVOLUTIONARY THOUGHT CACHING FOR MULTI-STAGE LANGUAGE MODEL SYSTEMS

CROSS-REFERENCE TO RELATED APPLICATIONS

Priority is claimed in the application data sheet to the following patents or patent applications, each of which is expressly incorporated herein by reference in its entirety:
Ser. No. 19/284,115
Ser. No. 19/051,193

BACKGROUND OF THE INVENTION

Field of the Invention

The present invention relates to systems and methods for evolutionary natural language processing using collaborative agent colonies with genetic algorithms and temporal archaeology to achieve self-improving reasoning capabilities and computational efficiency.

Discussion of the State of the Art

Language models have evolved significantly in recent years, with modern architectures demonstrating remarkable capabilities in natural language processing, reasoning, and generation tasks. These large language models (LLMs) have become increasingly sophisticated, processing and generating human-like text across a wide range of applications. As these models have grown in capability, they have also grown substantially in size, with some models containing hundreds of billions of parameters.

Modern LLMs process input prompts through complex architectures consisting of encoder and decoder blocks with attention mechanisms. Recent developments have revealed that these models often engage in an internal reasoning process, generating "thoughts" about a prompt before producing a final response. These thoughts represent the model's step-by-step reasoning and analysis of the input prompt. While some models expose these thoughts to users, others keep them internal to the model's processing pipeline. These reasoning steps have proven important to the model's ability to provide accurate and contextually appropriate responses.

Current approaches to improving language model efficiency have focused primarily on static optimization techniques such as caching previously generated reasoning patterns and retrieval-augmented generation systems. While these methods can reduce computational overhead by reusing stored information, they suffer from fundamental limitations in their ability to improve reasoning quality over time. Cached thoughts remain static and do not evolve to become more effective, and retrieval systems lack mechanisms for combining insights from different knowledge domains or learning from historical reasoning patterns.

Existing systems also lack collaborative intelligence mechanisms that would enable multiple specialized reasoning components to work together autonomously. Current architectures typically rely on single-model processing or simple routing between models, without the ability for specialized agents to democratically evaluate reasoning quality, breed improved thought patterns, or learn from historical successes and failures. This limits their capacity for self-improvement and adaptation to changing contexts for self-improvement and adaptation to changing contexts.

Furthermore, current language model systems have no capability for temporal archaeology—the ability to intelligently reconstruct and learn from compressed historical reasoning patterns. When context windows are exceeded, existing systems simply truncate or retrieve documents, losing the nuanced reasoning patterns that could inform future processing. This represents a significant missed opportunity for systems to develop deeper understanding through analysis of their own reasoning evolution over time The computational resources required to run these large models present significant challenges for widespread deployment and real-time applications. The memory and processing requirements often necessitate specialized hardware and substantial computational infrastructure. Additionally, context windows in current architectures limit the amount of information that can be processed in a single session, constraining the model's ability to maintain long-term context and engage in extended conversations.

What is needed is a system that combines autonomous agent colonies with evolutionary algorithms to create self-improving reasoning patterns through collaborative intelligence, genetic breeding of thoughts, and temporal archaeology capabilities that can reconstruct and learn from historical reasoning patterns while maintaining computational efficiency through multi-resolution context management.

SUMMARY OF THE INVENTION

Accordingly, the inventor has conceived and reduced to practice a computer system and method for evolutionary natural language processing that combines large and small language models with autonomous agent colonies capable of collaborative thought evolution and temporal archaeology. The system processes input data through a first large language model to generate thoughts with associated latent representations, which are cached and managed by specialized agents that communicate and collaborate to evaluate, modify, and evolve these thoughts using genetic algorithms. The evolved thoughts are retrieved based on similarity matching and processed through a smaller, more efficient language model to generate responses. This approach creates a self-improving ecosystem where autonomous agents continuously breed better reasoning patterns, reconstruct historical context through archaeological inference, and optimize system performance through democratic evaluation and evolutionary selection, thereby achieving superior computational efficiency while maintaining or improving response quality through collective intelligence and temporal learning.

According to an embodiment, a computer system comprises a hardware memory configured to execute software instructions that receive input data from a source, process the input data into thoughts using a first large language model, associate each thought with latent representations, cache the thoughts in a thought cache, manage specialized agents that perform domain-specific operations on cached thoughts, enable inter-agent communication for collaborative evaluation and modification of thoughts, generate evolved thoughts by combining characteristics from multiple cached thoughts using evolutionary algorithms executed by the specialized agents, retrieve cached or evolved thoughts based on similarity matching with newly received input data, route the input data and retrieved thoughts through a second large language model with fewer parameters, and generate responses using the second language model.

According to an aspect of an embodiment, the specialized agents comprise domain expert agents, curation agents, evolution agents, archaeology agents, and synthesis agents, while the thought cache implements a multi-level abstraction hierarchy with a base level storing original detailed thoughts, a summary level storing compressed reasoning chains, an insight level storing domain-specific conclusions, and a synthesis level storing high-level meta-patterns.

According to an aspect of an embodiment, generating evolved thoughts involves selecting parent thoughts based on fitness scores, applying crossover operations to combine characteristics from multiple parent thoughts, applying mutation operations to introduce controlled variations, and storing genealogy metadata for each evolved thought including parent thought identifiers, generation numbers, and mutation event history.

According to an aspect of an embodiment, inter-agent communication enables democratic evaluation processes where thoughts are distributed to multiple curation agents for independent assessment, evaluation scores are collected from the multiple agents, and thought retention or modification decisions are made based on aggregated evaluation scores that exceed predetermined consensus thresholds.

According to an aspect of an embodiment, archaeology agents analyze historical patterns in cached thoughts to identify recurring reasoning cycles, reconstruct compressed historical context using predictive expansion based on identified patterns, and generate archaeological inferences to fill gaps in compressed thought representations.

According to an aspect of an embodiment, each cached thought includes context DNA markers that encode temporal patterns, abstraction transitions, and success correlations, while fitness scores are determined using adaptive fitness functions that modify evaluation criteria based on historical success patterns and cross-domain performance metrics.

According to an aspect of an embodiment, crossover operations specifically combine thoughts from different knowledge domains to generate hybrid reasoning patterns, while inter-agent communication utilizes structured messaging protocols comprising sender identification, target specification, thought payload with metadata, and collaborative operation requests.

According to an aspect of an embodiment, the system archives successful reasoning patterns from previous agent iterations, transfers knowledge from archived patterns to newly instantiated agents, monitors performance metrics of individual specialized agents, and dynamically adjusts colony composition by modifying agent types and ratios based on performance analysis.

According to an aspect of an embodiment, thoughts evolve differently at each abstraction level with operations tailored to semantic granularity, while reconstructing compressed context involves identifying similar patterns through context DNA matching and applying machine learning models trained on successful reconstruction examples.

According to an aspect of an embodiment, the system autonomously optimizes performance by simulating evolutionary pressures through adaptive fitness functions based on current performance requirements, tracking reasoning pattern effectiveness across different temporal contexts, and implementing autonomous colony management that adjusts specialized agent allocation based on workload analysis and environmental constraints.

The invention also encompasses corresponding methods for evolutionary natural language processing with agent colonies that perform the same operations and achieve the same technical advantages as the computer system embodiments described above, providing comprehensive coverage for both apparatus and process implementations of the evolutionary agent colony technology.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 7 is a flow diagram illustrating an exemplary method for natural language processing using a dual-model approach with thought generation.

FIG. 9 is a flow diagram illustrating an exemplary method for synchronizing thought caches between local devices and a global cloud environment.

DETAILED DESCRIPTION OF THE DRAWING FIGURES

Figure 1:
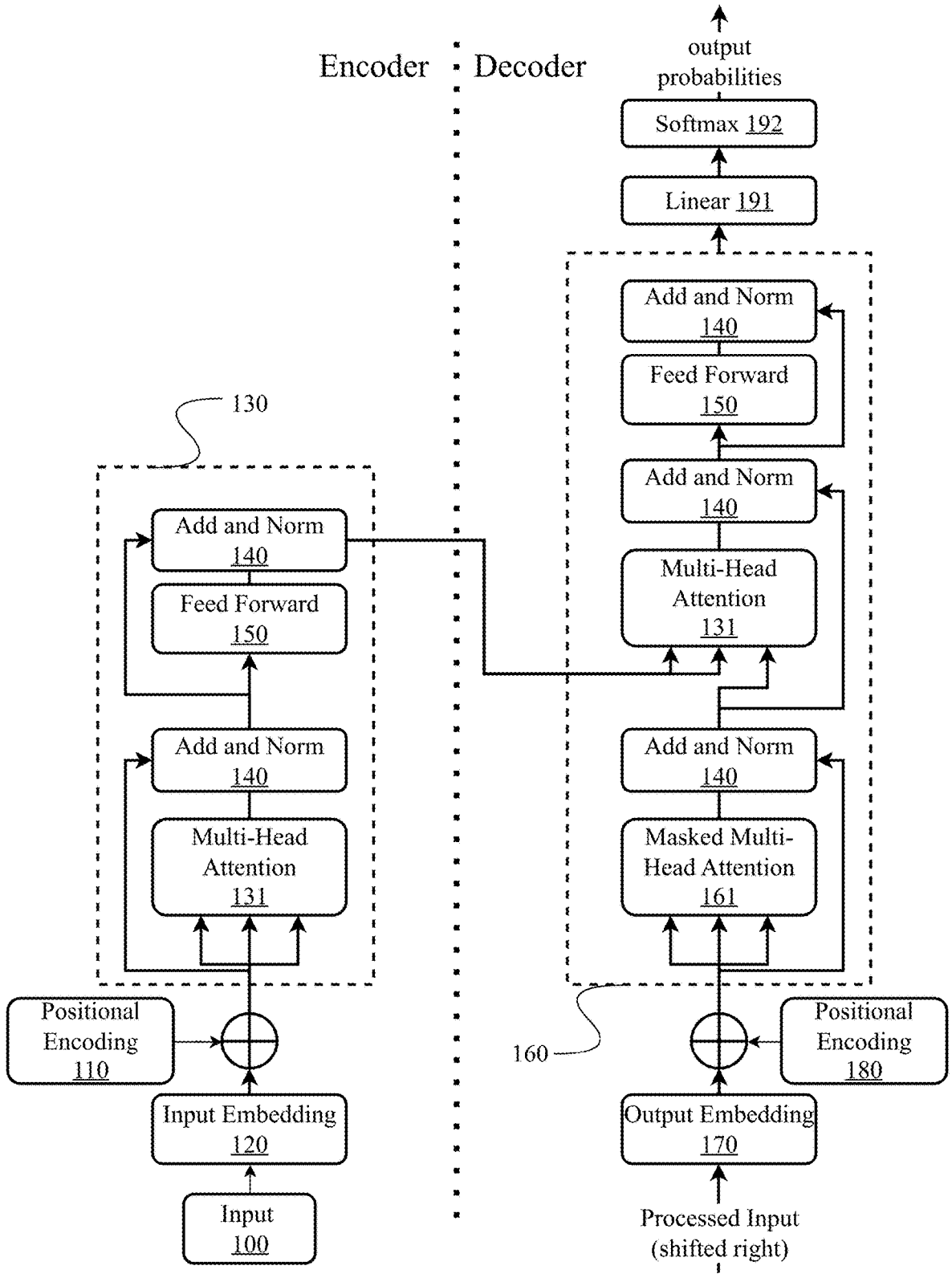
FIG. 1 (Prior Art) is a block diagram illustrating a common transformer architecture used in most large language models.

The inventor has conceived and reduced to practice a system and method for evolutionary natural language processing that combines autonomous agent colonies with genetic algorithms and temporal archaeology to create self-improving reasoning capabilities. The system processes input data through large language models to generate thoughts that are cached, evolved, and managed by specialized agents working collaboratively to optimize reasoning patterns over time. The system's design departs from conventional transformer architectures by separating the reasoning and generation phases across heterogeneous model sizes and memory structures. Rather than repeatedly invoking a full inference pipeline, the system stores intermediate reasoning steps as structured, queryable objects that can be independently evolved or recombined. This allows response generation to be offloaded to smaller models, improving scalability without loss of context. Additionally, the use of context DNA structures for memory management enables context reuse across arbitrarily long sessions without linear growth in memory or token costs.

An evolutionary natural language processing system comprises a thought cache subsystem that stores thoughts with associated latent representations, an agent management subsystem that coordinates multiple specialized agents, and a genetic algorithm subsystem that enables evolutionary breeding of thoughts. The system receives input data from a source and processes this data through a first large language model to generate a plurality of corresponding thoughts. Each thought is associated with a latent representation that captures semantic and contextual aspects of the input data. Thoughts also may be represented as a structured data object containing semantic embeddings, reasoning chains, abstraction metadata, and associated performance attributes.

A specialized agent architecture manages different types of autonomous agents that perform domain-specific operations on cached thoughts. Domain expert agents focus on specific knowledge areas such as mathematics, science, language, or logic, bringing specialized expertise to thought evaluation and generation processes. Curation agents assess thought quality through systematic evaluation criteria and democratic voting mechanisms. Evolution agents implement genetic algorithms to breed new thoughts by combining characteristics from existing thoughts. Archaeology agents analyze historical patterns and reconstruct compressed contextual information from past reasoning sessions. Synthesis agents combine insights from different knowledge domains to create hybrid reasoning patterns.

In some embodiments, domain expert agents may incorporate specialized machine learning models optimized for reasoning within their assigned knowledge domains. For instance, a mathematics-focused agent may use a graph neural network trained on symbolic computation data, while a language agent may use a transformer-based encoder fine-tuned on linguistic inference corpora. These models may operate during pre-processing, asynchronous background tasks, or offline intervals to generate high-fidelity thoughts, which are then stored in the thought cache for future low-cost retrieval and inference. This structure allows complex reasoning patterns to be distilled once, and reused many times, minimizing real-time computational burden.

An inter-agent communication subsystem enables collaborative evaluation and modification of thoughts through structured messaging protocols. Agents communicate using standardized message formats that include sender identification, target agent specification, thought payload with metadata, and specific operation requests. This communication framework supports democratic evaluation processes where multiple agents independently assess thoughts and contribute to collective decision-making about thought retention, modification, or elimination.

Inter-agent communication may be implemented using standardized or custom message schemas that include metadata, routing headers, and structured payloads. In some embodiments, communication may follow a message-passing protocol encoded in formats such as JSON, Protobuf, or lightweight binary serializations. Messages may include fields specifying sender and receiver agent IDs, operation type (e.g., evaluation, mutation, synthesis), associated thought identifiers, fitness metrics, or context lineage metadata. These protocols enable asynchronous collaboration and support distributed execution across hardware nodes or cloud environments while maintaining consistency in shared reasoning tasks.

A genetic algorithm subsystem implements evolutionary breeding of thoughts through selection, crossover, and mutation operations. Parent thoughts are selected from cached thoughts based on fitness scores that measure effectiveness across multiple dimensions including accuracy, efficiency, novelty, and transferability. Crossover operations combine characteristics from multiple parent thoughts to generate offspring thoughts that incorporate beneficial traits from different reasoning patterns. Mutation operations introduce controlled variations to prevent stagnation and explore new reasoning possibilities. Each evolved thought includes genealogy metadata that tracks parent thought identifiers, generation numbers, and mutation event history.

In certain embodiments, the evolution agents may implement diverse genetic algorithm strategies such as uniform crossover, subtree recombination, or mutation via embedding-space perturbations. Thought representations may be structured as vectors, graphs, or symbolic trees depending on the domain and agent design. Mutation operations may involve altering logical operators, reweighting latent dimensions, or inserting novel inference steps. Fitness evaluation may be learned or rule-based, and may include factors such as past reuse frequency, semantic novelty, alignment with domain-specific objectives, or voting consensus among curation agents. The system may use multi-objective fitness optimization to balance conflicting goals such as accuracy, generality, and computational efficiency.

A multi-level abstraction hierarchy organizes thoughts across different semantic granularities within a thought cache. A base level stores original detailed thoughts with complete reasoning chains and contextual information. A summary level stores compressed reasoning chains that preserve essential logical steps while reducing storage requirements. An insight level stores domain-specific conclusions and high-level understanding derived from summary level information. A synthesis level stores meta-patterns and cross-domain insights that capture relationships between different knowledge areas.

A temporal archaeology subsystem analyzes historical patterns in cached thoughts to enable intelligent reconstruction of compressed contextual information. Archaeology agents identify recurring reasoning cycles, detect emerging trends in thought evolution, and correlate environmental factors with reasoning pattern success rates. The subsystem reconstructs compressed historical context using predictive expansion techniques based on identified patterns and generates archaeological inferences to fill gaps in compressed thought representations.

Archaeology agents may employ machine learning models such as recurrent neural networks, attention-based temporal models, or encoder-decoder architectures to detect cyclical reasoning patterns or reconstruct historical context. In one embodiment, compressed thoughts may include temporal markers and abstraction paths, which are matched against prior sequences to infer missing logic or context. Reconstruction models may be trained on historical logs of thought evolution, allowing the system to probabilistically recover context details even when original thoughts have been compressed or pruned. These operations may occur asynchronously or in batch mode, enabling predictive expansion without adding load to the primary inference loop.

A context DNA subsystem encodes genealogical and temporal information for each thought using structured markers that track evolutionary lineage and success patterns. Context DNA markers encode temporal creation and access patterns, abstraction level transitions during thought evolution, success correlation patterns with related thoughts, and environmental conditions during thought creation and application. This genetic marking system enables similarity matching between current contexts and historical patterns to guide reconstruction and evolution processes.

Context DNA markers may be implemented as structured metadata objects or embedded vectors that encode information about a thought's ancestry, abstraction path, and usage history. In some embodiments, this structure includes fields identifying parent thought IDs, mutation events, abstraction transitions, and temporal phase labels. The lineage graph formed by these markers may be stored in an indexed database, which supports efficient traversal and similarity queries. The system may use this structure to guide selection during evolution, prioritize thoughts during retrieval, or identify which patterns are historically robust across changing prompt types or domains. In some embodiments, thoughts and their associated context DNA may be stored in a graph database or vector-indexed key-value store to support low-latency retrieval and similarity matching.

Thought similarity may be computed by evaluating both structural lineage and semantic embedding distance. In one implementation, the system may store each thought as a structured object containing fields such as an embedding vector, abstraction level, parent identifiers, and mutation tags. During retrieval, thoughts may be compared using cosine similarity over embeddings combined with tag-based overlap scoring for discrete fields. The result is a hybrid similarity metric that allows the system to retrieve related thoughts even when exact structural matches are unavailable. These values may be computed at runtime or indexed in advance for performance.

In some embodiments, fitness scoring for thought evolution may be determined by an evolution engine based on a combination of quantifiable criteria. For example, logical consistency may be assessed by verifying that the internal structure of a reasoning chain adheres to valid inferential patterns or satisfies domain-specific logic rules. Accuracy may be estimated by comparing factual elements within the thought to known references or historical outcomes, including prior instances where similar thoughts produced successful results. Reasoning efficiency may be expressed as a ratio of inference complexity to computational effort, such as the number of logical steps normalized against task difficulty or input dimensionality.

An evolution engine may also take into account how well a thought generalizes across domains. In one implementation, semantic embeddings of thoughts may be compared to domain-specific centroids or exemplar vectors to estimate cross-domain adaptability. Additionally, the system may apply time-weighted success metrics, such that thoughts degrade in fitness when no longer yielding useful results, with decay functions optionally applied to reflect task recency and relevance.

Fitness values may be calculated as weighted combinations of these criteria, with weights dynamically adjusted over time. For instance, when historical trends indicate that temporal relevance is strongly correlated with successful downstream reasoning, the evolution engine may increase the weighting applied to that dimension. These dynamic weightings allow the system to evolve its evaluation logic in response to observed performance.

In generating new candidate thoughts, evolution agents may select parent thoughts from the regenerative context cache based on comparative fitness. In one implementation, a pool of high-scoring thoughts may be sampled using probabilistic methods. For example, crossover may involve randomly selecting structural or semantic features from two or more parents to form a new reasoning chain, embedding vector, or symbolic expression. The crossover logic may operate at different abstraction levels, depending on the granularity of the source thoughts.

To preserve novelty and avoid premature convergence, evolution agents may introduce mutation events that perturb selected components of a thought. For example, mutation may involve reweighting latent features, modifying symbolic reasoning operators, or inserting or removing intermediate steps in a reasoning sequence. Mutation intensity may be adaptively regulated based on population similarity; when multiple candidate thoughts exhibit high semantic overlap, mutation likelihood may be increased to introduce new variation.

Throughout this process, a context DNA engine may maintain lineage data, including parent identifiers, generation numbers, mutation history, abstraction transitions, and historical performance data. These lineage markers enable the system to trace the genealogical development of thoughts and facilitate similarity-based retrieval and guided reconstruction.

In some implementations, collaborative thought assessment may be performed by multiple curation agents operating in parallel. Each agent may evaluate proposed thoughts based on criteria such as logical soundness, domain alignment, semantic clarity, and utility for downstream tasks. These scores may be normalized and reported to a colony orchestrator, which may aggregate them to determine whether the thought should be retained, modified, or rejected.

An orchestrator may, in some implementations, adjust the influence of agent-provided scores by factoring in each agent's historical alignment with validated outcomes. Agents that have demonstrated consistent reliability over time, such as those whose evaluations frequently match post-deployment success, may be weighted more heavily during consensus formation. To mitigate the impact of outliers or inconsistent evaluators, the orchestrator can enforce minimum consensus thresholds or define acceptable variance ranges across agent assessments.

To support continuity across abstraction levels, the system may utilize the context DNA engine to compute similarity between thoughts. This can involve comparing both discrete attributes such as lineage identifiers or mutation markers, and continuous features like semantic embeddings or abstraction trajectories. By combining these dimensions, the system is able to identify semantically or structurally related thoughts, which can be leveraged for reconstruction, retrieval, or hybrid synthesis.

In scenarios involving large-scale thought repositories, the system may use indexed data structures to accelerate similarity matching, particularly for thoughts with high fitness or frequent reuse. Approximate lookup techniques, including hashing or signature-based filters, may be employed to reduce computational cost while preserving acceptable match fidelity.

Reusing and refining existing thoughts instead of regenerating reasoning from scratch may yield measurable efficiency improvements. For instance, when a previously validated thought is retrieved and adapted to a new input, the system can avoid invoking a full inference pass through a large-scale language model. This approach is particularly effective in constrained domains where reasoning tasks often exhibit recurring structures or predictable query patterns.

As the evolutionary feedback loop progresses, reasoning quality may also improve. Successive generations of thoughts can reflect deeper coherence, better generalization across domains, or more accurate alignment with factual knowledge. When these adaptive processes are combined with predictive reconstruction and workload-aware colony management, the result is a language processing system capable of long-term learning and context expansion without proportional increases in computational demand.

In some embodiments, thought quality improvements may be tracked over time using versioned metadata associated with each evolved generation. The system may log historical performance attributes such as reuse count, acceptance rate by curation agents, and average fitness scores, enabling longitudinal analysis of evolutionary success. This historical traceability supports further optimization and provides a basis for validating the effectiveness of system-guided learning over multiple iterations.

The disclosed system improves the functioning of a computer system by introducing a novel multi-model architecture with a hierarchical memory structure that reduces redundant computation and enables long-term reasoning continuity across sessions. Unlike conventional transformer-based systems that repeatedly invoke full inference passes and lose context when session windows expire, this system retains structured intermediate reasoning artifacts referred to as "thoughts" in a context-aware cache that supports similarity-based retrieval and evolutionary refinement. By offloading response generation to a smaller language model after an initial high-fidelity reasoning phase, the system achieves significant reductions in computation and memory usage. These improvements are not achievable using generic computing components alone, as they require specialized data structures such as context DNA, inter-agent communication protocols, and evolutionary logic that operate together to optimize reasoning efficiency, support persistent cross-domain learning, and extend effective context windows without linear scaling of computational resources.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "thought" refers to a discrete unit of reasoning or analysis generated by a large language model during its processing of an input prompt. A thought represents the model's intermediate reasoning steps, analysis, or considerations about the prompt before generating a final response. Thoughts are generated during a reasoning phase of the model's operation and contain the model's understanding, context analysis, and logical processing of the prompt. Unlike raw text or embeddings, thoughts encapsulate the model's processed reasoning in a form that can be cached, retrieved, and reused for similar prompts. Thoughts may be explicitly visible in model outputs or may be internally generated, and can be stored in various cache architectures including local and cloud-based systems. These cached thoughts can be combined with new prompts to generate responses using smaller language models, effectively preserving the reasoning capabilities of larger models while reducing computational overhead. In some embodiments, a thought may be represented as a structured data object comprising semantic embeddings, reasoning chains, abstraction metadata, and lineage markers such as parent identifiers or context DNA.

As used herein, "context" refers to both traditional sequence-based context where a language model processes a series of tokens representing prior interactions or information, and thought-based context where the model processes higher-level abstractions in the form of thought sequences. Traditional context operates at the token level, maintaining a history of specific words, phrases, and their relationships through mechanisms like attention windows. In contrast, thought-based context operates at a higher level of abstraction, where each thought represents a complex unit of reasoning or understanding. This dual nature of context allows the system to maintain contextual awareness both through detailed token-level information and through more abstract thought-level representations, enabling efficient processing of complex interactions while reducing the computational overhead typically associated with maintaining long token sequences. Thought-based context can compress what would traditionally require thousands of tokens into a smaller number of thought units, each capturing key reasoning patterns and conceptual relationships relevant to the interaction.

As used herein, "latent representation" refers to a numerical vector or encoded structure derived from a machine learning model that captures semantic, syntactic, or contextual attributes of an input or generated thought.

As used herein, "specialized agent" refers to a discrete software entity or execution unit configured to perform domain-specific operations on cached thoughts, such as evaluation, mutation, synthesis, or domain reasoning. Agents may operate independently or collaboratively and may communicate using structured messaging protocols.

As used herein, "evolutionary algorithm" refers to a computational process that generates new candidate thoughts by selecting, combining, and mutating prior thoughts based on fitness scores or other performance metrics, in order to optimize reasoning quality or utility over successive iterations.

As used herein, "fitness score" refers to a quantifiable value associated with a thought that reflects its effectiveness according to one or more evaluation criteria, which may include logical consistency, accuracy, reasoning efficiency, temporal relevance, or domain adaptability.

As used herein, "context DNA" refers to a data structure that encodes genealogical, temporal, and abstraction-level metadata associated with a thought, including parent identifiers, generation number, mutation history, and historical performance data. Context DNA may be used to guide retrieval, reconstruction, or selection operations.

As used herein, "multi-level abstraction hierarchy" refers to an organized structure for storing thoughts at varying levels of semantic granularity, which may include, for example, detailed reasoning, summarized logic, domain-specific insights, and high-level synthesis patterns.

As used herein, "collaborative evaluation" refers to a process by which multiple agents independently or jointly assess a thought's quality or relevance and optionally aggregate their assessments using scoring, voting, or consensus techniques.

As used herein, "evolved thought" refers to a thought that has been generated by combining or mutating prior thoughts using one or more evolutionary algorithms, and may include metadata identifying its parent thoughts and transformation history.

Foundational System Architecture

FIG. 1 (Prior Art) is a block diagram illustrating a common transformer architecture used in most large language models. A transformer generally comprises an encoder (the components on the left side of the illustration) and a decoder (the components on the right side of the illustration).

The illustrated transformer comprises an encoder and a decoder. The encoder takes input embeddings and processes them through a stack of layers (represented as dashed box

130). Each layer consists of: positional encoding, which adds position information to the input embeddings; multi-head attention, which allows the model to attend to different parts of the input sequence; add and norm, which applies residual connection and layer normalization; feed forward, which is a fully connected feed-forward network; and add and norm which is another residual connection and layer normalization.

The power of the transformer model lies in the self-attention mechanism. This mechanism contributes to accelerated learning compared to traditional models such as long short-term memory models. Self-attention empowers the transformer model with the remarkable capability to meticulously scrutinize distinct segments of a given sequence or even encompass the entire contextual essence of a sentence. This profound contextual awareness enables the model to make predictions with an elevated degree of accuracy and relevance.

The transformer takes a processed vector as its input 100. The input embedding 120 to the encoder is a sequence of tokens, typically represented as integers. Each token is mapped to a learnable embedding vector of a fixed size. The embedding layer is a lookup table that converts each token into its corresponding dense vector representation. The embeddings are learned during training and capture semantic and syntactic relationships between tokens.

A dense vector representation, also known as a dense embedding or a continuous vector representation, is a way of representing data, particularly words or tokens, as dense vectors in a high-dimensional continuous space. In the context of natural language processing (NLP) and language models, dense vector representations are used to capture semantic and syntactic information about words or tokens. Each word or token is mapped to a fixed-size vector of real numbers, typically with hundreds or thousands of dimensions. Each word or token is represented by a vector of a fixed size, regardless of the length of the input sequence. The size of the vector is a hyperparameter that is determined during model design. The vectors exist in a continuous high-dimensional space, where each dimension represents a latent feature or aspect of the word or token. The continuous nature allows for capturing fine-grained relationships and similarities between words. The dense vector representations are learned during the training process of the model. The model learns to assign similar vectors to words that have similar meanings or occur in similar contexts. The dense vector representations aim to capture semantic and syntactic relationships between words. Words that have similar meanings or are used in similar contexts tend to have similar vector representations. Dense vector representations allow for performing algebraic operations on words, such as addition and subtraction. These operations can capture analogies and relationships between words, such as "prince"−"man"+"woman"≈"princess". Dense vector representations serve as input features for various downstream NLP tasks, such as text classification, sentiment analysis, named entity recognition, and machine translation. The dense representations provide a rich and informative input to the models, enabling them to learn patterns and make predictions. Some popular examples of dense vector representations include, but are not limited to, Word2Vec, Global Vectors for Word Representations (GloVe), FastText, and BERT.

After the input embedding layer, positional encoding 110 is added to the input embedding to provide position information to the model. Since the Transformer architecture doesn't have inherent recurrence or convolution, positional encodings help capture the order and relative positions of tokens. The positional encodings are typically sine and cosine functions of different frequencies, allowing the model to learn relative positions. The positional encodings have the same dimensionality as the input embeddings and are summed with them.

The encoder utilizes a multi-head attention mechanism 131 which is a key component of the transformer architecture. It allows the encoder to attend to different parts of the input sequence and capture dependencies between tokens. The attention mechanism computes three matrices: query (Q), key (K), and value (V). The query, key, and value matrices are obtained by linearly projecting the input embeddings using learned weight matrices. The attention scores are computed by taking the dot product of the query matrix with the transpose of the key matrix, followed by scaling and applying a softmax function. The attention scores determine the importance of each token in the input sequence for a given position. The value matrix is then multiplied with the attention scores to obtain the weighted sum of the values, which forms the output of the attention mechanism. Multi-head attention splits the query, key, and value matrices into multiple heads, allowing the model to attend to different aspects of the input simultaneously. The outputs from each head are concatenated and linearly projected to obtain the final output of the multi-head attention layer 131.

After the multi-head attention layer, a residual connection is applied, followed by layer normalization at add and norm 140. The residual connection adds the input embeddings to the output of the attention layer, helping the model learn faster and deeper. Layer normalization normalizes the activations across the features, stabilizing the training process.

While traditional multi-head attention mechanisms contributes to accelerated learning compared to models like LSTMs, innovations like multi-head Latent Attention (MLA) further enhance efficiency through low-rank key-value joint compression. MLA achieves this by compressing the key-value pairs into a latent vector, significantly reducing the key value cache required during inference while maintaining or improving performance compared to standard multi-head attention mechanism. The attention mechanism still empowers the model to scrutinize distinct segments of sequences, but MLA does so while requiring only a fraction of the computational resources The feed forward layer 150 is a fully connected neural network applied to each position of the encoder's hidden states. It consists of two linear transformations with a Rectified Linear Unit (ReLU) activation function in between. The purpose of the feed forward 150 layer is to introduce non-linearity and increase the model's capacity to learn complex representations. The output of the feed forward 150 layer has the same dimensionality as the input embeddings. A residual connection and layer normalization 140 are applied after the feed forward 150 layer. The encoder layers 130 are stacked Nx times, where N is a hyperparameter that determines the depth of the Encoder. Each layer follows the same structure: multi-head attention, add & norm, feed forward, and add & norm. By stacking multiple encoder layers, the model can capture hierarchical and long-range dependencies in the input sequence. The output of the final encoder layer represents the encoded input sequence, which is then passed to the decoder for generating the output sequence.

The decoder generates the output probabilities. It has a similar structure to the Encoder, with a few additions. The decoder takes output embeddings and processes them through a stack of layers (represented as dashed box 160). The output embedding layer 170 takes the previous processed input tokens (shifted right by one position) and converts them into dense vectors. Each token is mapped to a learnable embedding vector of a fixed size. The embedding vectors capture semantic and syntactic relationships between tokens.

Positional encoding 180 is added to the output embedding 170 to provide position information to the model. Since the transformer architecture does not have inherent recurrence or convolution, positional encodings help capture the order and relative positions of tokens. The positional encodings are typically sine and cosine functions of different frequencies, allowing the model to learn relative positions.

The masked multi-head attention 161 mechanism prevents the model form attending to future tokens. This layer performs self-attention on the decoder's input sequence. It allows the decoder to attend to different parts of its own input sequence. The attention is "masked" to prevent the decoder from attending to future tokens, ensuring that the predictions are based only on the previously generated tokens. Multi-head attention splits the input into multiple heads, allowing the model to attend different aspect of the input simultaneously.

After the masked multi-head attention, a residual connection is applied follows by layer normalization via add and norm 140. The residual connection adds the input to the output of the attention layer, helping the model learn faster and deeper. Layer normalization normalizes the activations across the features, stabilizing the training process.

The multi-head attention 131 layer performs attention between the decoder's hidden states and the encoder's output. It allows the decoder to attend to relevant parts of the input sequence based on the encoder's representations. The attention weights are computed based on the compatibility between the Decoder's hidden states and encoder's outputs.

Another add and norm 140 layer is then followed by feed forward network 150. This a fully connected feed-forward network applied to each position of the decoder's hidden states. It consists of two linear transformations with a Rectified Linear Unit (ReLU) activation in between. The feed forward layer helps the model capture non-linear interactions and increases the model's capacity.

Another add and norm 140 layer is followed by linear 191 and softmax 192 layers. The final hidden states of the decoder are passed through a linear transformation to project them into the vocabulary space. Vocabulary space refers to the set of all unique tokens or words that the model can generate or predict. In the context of language models, the vocabulary is a predefined set of tokens that the model is trained on and can output. When the decoder's final hidden states are passed through a linear transformation, they are projected into a vector space with the same dimensionality as the size of the vocabulary. Each dimension in this space corresponds to a specific token in the vocabulary. For example, the model has a vocabulary of 10,000 unique tokens. The linear transformation would project the decoder's hidden states into a 10,000-dimensional vector space. Each element in this vector represents the model's predicted probability or score for the corresponding token in the vocabulary.

A softmax function is applied to the projected values (vectors) to generate output probabilities over the vocabulary. The softmax function normalizes the values so that they sum up to 1, representing a probability distribution over the vocabulary. Each probability indicates the likelihood of a specific token being the next output token. The token with the highest probability is selected as the next output token. During the model's training, the objective is to maximize the probability of the correct next token given the input sequence and the previously generated tokens. The model learns to assign higher probabilities to the tokens that are more likely to appear based on the context. At inference time, the token with the highest probability in the vocabulary space is selected as the next output token. This process is repeated iteratively, with the generated token being fed back into the decoder as input for the next step, until a stopping criterion is met (e.g., reaching a maximum length or generating an end-of-sequence token). The size and composition of the vocabulary can vary depending on the specific task and the data the model is trained on. It can include words, sub-words, or even characters, depending on the tokenization strategy used.

The decoder layers 160 can be stacked Nx times, allowing the model to capture complex dependencies and generate coherent output sequences.

This transformer architecture allows the model to process input sequences, capture long-range dependencies, and generate output sequence based on the encoded input and the previously generated tokens.

There are at least three variations of transformer architecture that may enable an LCM. A first such variation comprises Auto-Encoding Models. In autoencoders, the decoder portion of the transformer is discarded after pre-training and only the encoder is used to generate the output. The popular BERT and ROBERTa models are examples of models based on this architecture and perform well on sentiment analysis and text classification. These types of models may be trained using a process called masked language modeling (MLM).

The primary goal of an autoencoder is to learn efficient representations of input data by encoding the data into a lower-dimensional space and then reconstructing the original data from the encoded representation. Autoencoders are trained in an unsupervised manner, meaning they don't require labeled data. They learn to capture the underlying structure and patterns in the input data without explicit guidance. An autoencoder consists of two main components: an encoder and a decoder. The encoder takes the input data and maps it to a lower-dimensional representation, often referred to as the latent space or bottleneck. The decoder takes the latent representation and tries to reconstruct the original input data. Autoencoders can be used for dimensionality reduction by learning a compressed representation of the input data in the latent space. The latent space has a lower dimensionality than the input data, capturing the most salient features or patterns. The training objective of an autoencoder is to minimize the reconstruction error between the original input and the reconstructed output. The model learns to encode and decode the data in a way that preserves the essential information needed for reconstruction. Variants and extensions of autoencoders can include denoising autoencoders, variational autoencoders (VAEs) which introduce a probabilistic approach to autoencoders wherein they learn a probabilistic encoder and decoder, allowing for generating new samples from the learned latent space, and conditional autoencoders which incorporate additional conditions or labels as input to the encoder and decoder, enabling the generation of samples conditioned on specific attributes.

Autoencoders can have various applications. Autoencoders can be used to detect anomalies by measuring the reconstruction error. Anomalous samples tend to have higher reconstruction errors compared to normal samples. Autoencoders can be used as a pre-training step to learn meaningful features from unlabeled data. The learned features can then be used for downstream tasks like classification or clustering. Additionally, or alternatively, autoencoders, particularly VAEs, can be used as generative models to generate new samples similar to the training data by sampling from the learned latent space. It's worth noting that while autoencoders can be effective for certain tasks, they have some limitations. They may struggle to capture complex dependencies and may generate blurry or less sharp reconstructions compared to other generative models like Generative Adversarial Networks (GANs).

Another type of variation is the auto-regressive model which feature the use of only the decoder portion of the transformer architecture. In autoregressive architectures, the decoder portion of the transformer is retained and the encoder portion is not used after model pre-training. Auto-regressive models are a class of models that generate outputs by predicting the next element based on the previously generated elements. In the context of the Transformer architecture and language modeling, auto-regressive models are commonly used for tasks such as text generation, machine translation, and language understanding.

Auto-regressive models generate outputs sequentially, one element at a time. In the case of language modeling, the model predicts the next word or token based on the previous words or tokens in the sequence. The prediction of the next element is conditioned on the previously generated elements. The model learns the conditional probability distribution $P(x_t|x_1, x_2, \ldots, x_{t-1})$, where $x_t$ is the element at position t, and $x_1, x_2, \ldots, x_{t-1}$ are the previously generated elements. The transformer architecture, particularly the decoder component, is well-suited for auto-regressive modeling. The decoder generates the output sequence one element at a time, conditioned on the previously generated elements and the encoded input sequence from the encoder. In the transformer decoder, the self-attention mechanism is masked to prevent the model from attending to future positions during training. This masking ensures that the model relies only on the previously generated elements to make predictions, following the auto-regressive property. During training, the transformer decoder uses a technique called teacher forcing. Instead of feeding the model's own predictions as input for the next step, the ground truth target sequence is used. This helps the model learn to generate the correct output sequence based on the input sequence and the previous target tokens. During inference or generation, the transformer decoder generates the output sequence one element at a time. At each step, the model takes the previously generated elements as input and predicts the next element. This process continues until a stopping criterion is met, such as reaching a maximum sequence length or generating an end-of-sequence token. Auto-regressive models, including the transformer, have achieved state-of-the-art performance in language modeling tasks. They excel at capturing the statistical properties and dependencies in sequential data, making them effective for generating coherent and fluent text.

While text generation is the most suitable use case of auto-regressors, they perform exceptionally well on a wide variety of tasks. Most modern LLMs are auto-regressors including, for example, the popular GPT series of LLMs, BERT, and XLNet.

The third variation of the transformer model is the sequence-to-sequence model which utilizes both the encoder and decoder portions of the transformer and can be trained in multiple ways. One of the methods is span corruption and reconstruction. These models are, generally, best suited for language translation. The T5 and BART family of models are examples of sequence-to-sequence models.

Figure 2:
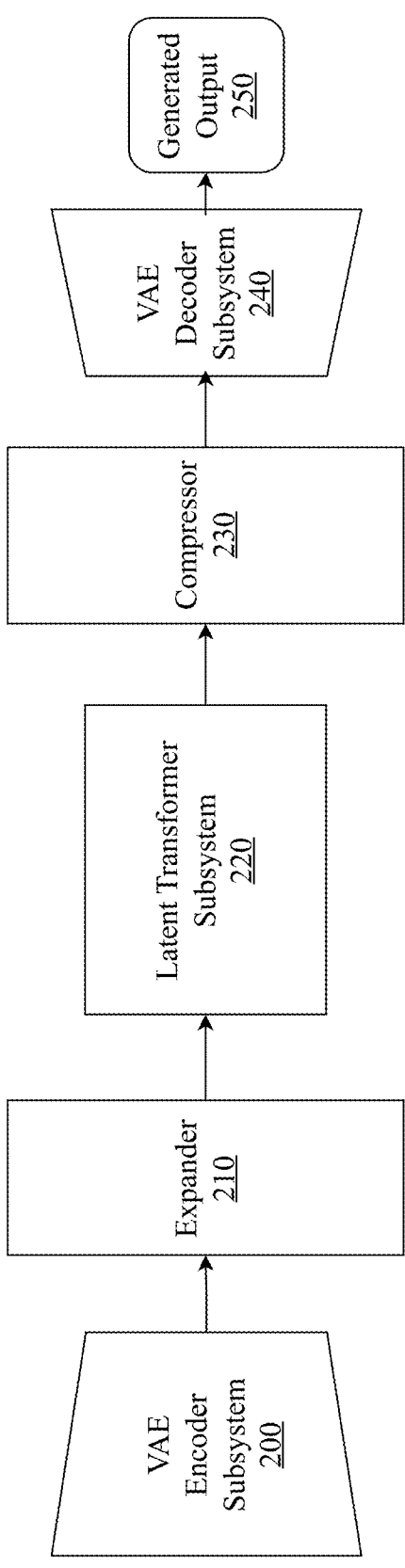
FIG. 2 is a block diagram illustrating an exemplary architecture for a latent transformer, where the transformer operates on latent space vector representations of an input.

FIG. 2 is a block diagram illustrating an exemplary architecture for a latent transformer, where the transformer operates on latent space vector representations of an input. Central to a latent transformer is a latent transformer subsystem 220, which serves as the central processing unit responsible for learning the underlying patterns, relationships, and dependencies within the input data. Latent transformer subsystem 220 leverages advanced techniques such as self-attention mechanisms and multi-head attention to capture the complex interactions and sequences in the data, enabling it to generate accurate and context-aware outputs.

The input to latent transformer subsystem 220 is provided by a VAE (Variational Autoencoder) encoder subsystem 200. VAE encoder subsystem 600 is responsible for encoding an input into a lower-dimensional latent space representation. VAE encoder subsystem 200, learns to compress the data into a compact latent space representation while preserving the essential features and characteristics of the input. Latent space vectors produced by the VAE encoder subsystem 200 may be further processed by an expander 210, which increases the dimensionality of the input data to a point where the vectors can be efficiently processed by latent transformer subsystem 220.

A latent space representation of the input generated by VAE encoder subsystem 200 serves as the input to latent transformer subsystem 220. Latent transformer subsystem 220 operates in this latent space, leveraging the compressed and informative representation to learn the complex patterns and relationships within the data. By working in the latent space, latent transformer subsystem 220 can efficiently process and model the data, capturing the intricate dependencies and generating accurate and meaningful outputs.

Once latent transformer subsystem 220 has processed the latent space representation, the generated output is passed through a VAE decoder subsystem 240. VAE decoder subsystem 240 is responsible for decoding the latent space representation back into the original data space. Prior to processing by VAE decoder subsystem 240, latent transformer subsystem 220 outputs may be compressed back to an original size before being processed by the expander 210 by being processed by a compressor 230. VAE decoder subsystem 240 learns to reconstruct the original data from the latent space representation, ensuring that the generated output is coherent and meaningful.

The reconstructed output from VAE decoder subsystem 240 is provided as a compressed generated output 250. The compressed generated output 250 represents the final result of the latent transformer, which is a compressed version of the original input.

VAE encoder subsystem 200 and VAE decoder subsystem 240 play large roles in the overall functioning of the latent transformer. VAE encoder subsystem 200 enables the system to learn a compressed and informative representation of the input data in the latent space, while the VAE decoder subsystem 240 ensures that the compressed generated output 250 is coherent and meaningful by reconstructing it back into the original data space. The combination of these subsystems allows the latent transformer to focus on learning the complex patterns and relationships within the data, leading to accurate and context-aware outputs.

The specific architectures and parameters of VAE encoder subsystem 200, latent transformer subsystem 220, and VAE decoder subsystem 240 can be customized and adapted based on the characteristics and requirements of the input data and the specific task at hand. The modular design of the system allows for flexibility and extensibility, enabling the integration of different architectures, attention mechanisms, and training techniques to optimize the performance and efficiency of the latent transformer.

Figure 3:
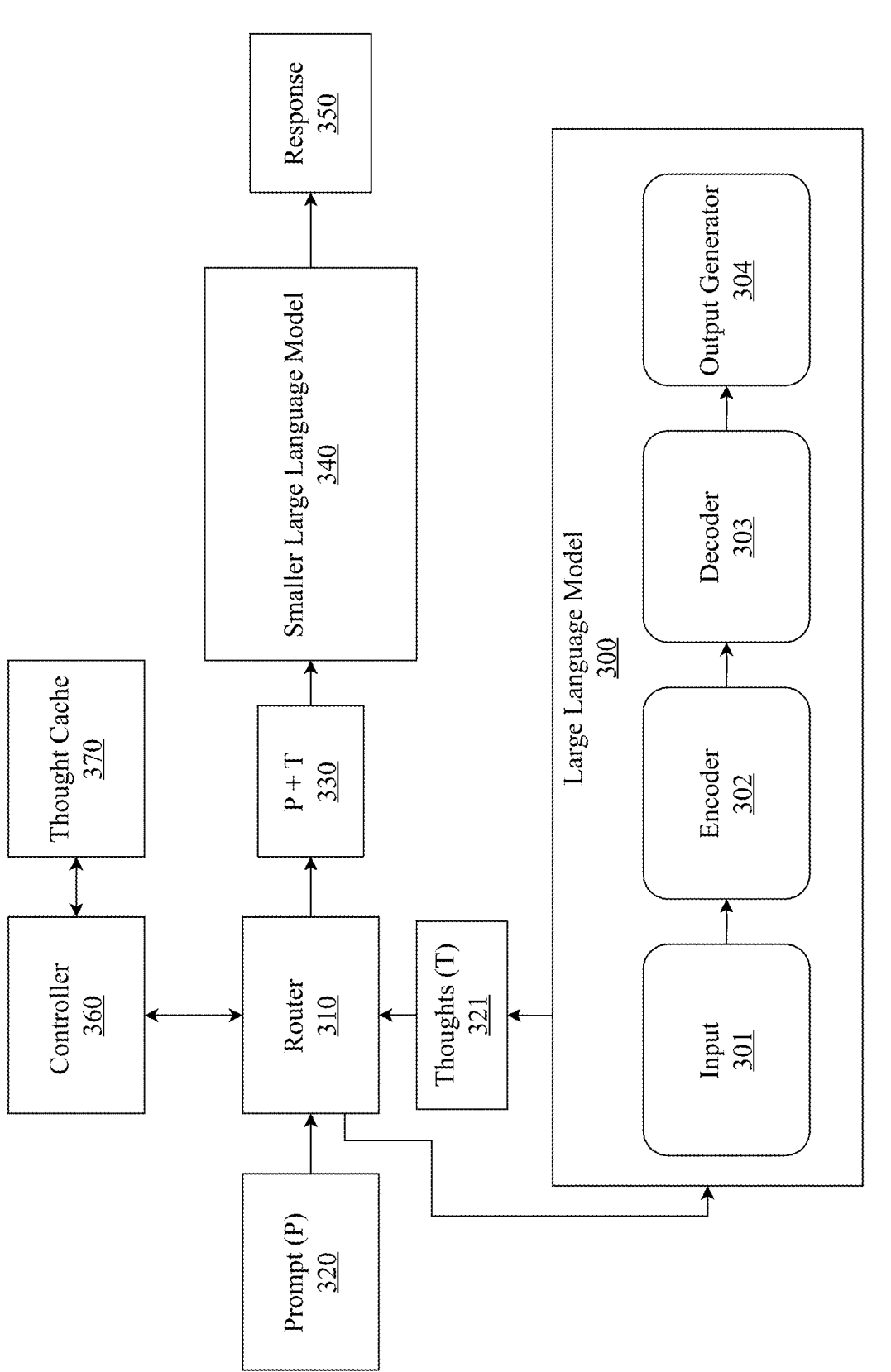
FIG. 3 is a block diagram illustrating an exemplary system architecture for a multi-state LLM with unlimited context.

FIG. 3 is a block diagram illustrating an exemplary system architecture for a multi-state LLM with unlimited context. The system includes a large language model 300, a router 310, a controller 360, a thought cache 370, and a smaller language model 340 that work together to process prompts and generate responses while optimizing computational resources.

The system receives an initial prompt (P) 320 through the router 310. The router serves as the central control component, determining whether to utilize the large language model 300 or access the thought cache 370 through the controller 360. Upon receiving a prompt, the router first queries the thought cache to determine if relevant thoughts exist for similar prompts.

The large language model 300 includes an input component 301, an encoder 302, a decoder 303, and an output generator 304. The large language model 300 can utilize various internal architectures, including but not limited to traditional transformer cores (as shown in FIG. 1) or latent transformer cores (as shown in FIG. 2). The model's attention mechanisms can be implemented using either standard multi-head attention (MHA) or multi-head latent attention (MLA), with the overall system functioning identically regardless of the specific attention mechanism chosen. When using MLA, the model benefits from reduced KV cache requirements during inference while maintaining performance comparable to or better than traditional MHA implementations. When the router determines that cached thoughts are not available or suitable, the prompt is processed through the large language model 300. During this processing, the model enters a reasoning phase where it generates thoughts (T) 321 about the prompt. These thoughts represent the model's analysis and reasoning about the prompt before generating a final response.

The controller 360 manages interaction with the thought cache 370, which can be implemented as either a local or cloud-based storage system. The thought cache stores previously generated thoughts in a vector database format, allowing for efficient retrieval of relevant thoughts for similar prompts. The cache can maintain both session-specific thoughts for temporary storage and long-term thoughts for persistent knowledge.

When thoughts are either generated by the large language model or retrieved from the cache, they are combined with the original prompt to create a prompt and thought combination (P+T) 330. This combination is then routed to the smaller language model 340, which requires significantly fewer computational resources than the large model. The smaller model processes the P+T 330 combination to generate the final response 350.

In operation, for example, if a user submits a prompt asking about climate change impacts, the router first checks the thought cache for relevant existing thoughts. If suitable thoughts exist, they are retrieved and combined with the prompt. If no relevant thoughts are found, the large model processes the prompt to generate new thoughts about climate science, global impacts, and relevant data. These thoughts, combined with the original prompt, are then processed by the smaller model 340 to generate a concise, relevant response. The new thoughts are also cached for future use. To demonstrate how thoughts are created, imagine the prompt "What do you think is the future of string theory, particularly given the spectacular failure of supersymmetry at LHC" being entered into the LLM DeepSeek. During the reasoning phase, the model returns to the user the following thoughts:

"Okay, the user is asking about the future of string theory in light of supersymmetry not being found at the LHC. Let me start by recalling what I know about string theory and SUSY.

String theory relies heavily on supersymmetry because SUSY helps stabilize the extra dimensions and makes the math work better. But the LHC hasn't found any superpartners, which challenges some of the more popular SUSY models. However, I should note that SUSY isn't the only part of string theory. There are versions without it, like bosonic string theory, but those aren't as developed or realistic.

The user might be implying that since SUSY isn't found, string theory is in trouble. I need to address that but also explain why it's not the whole story. Maybe mention that SUSY could still exist at higher energy scales beyond LHC's reach. Also, string theory has other applications beyond particle physics, like in condensed matter or quantum gravity.

I should break down the response into points. First, clarify the relationship between SUSY and string theory. Then discuss the LHC results and their implications. Talk about other areas where string theory contributes, like holography or black hole physics. Mention alternatives within string theory that don't rely on low-energy SUSY. Also, touch on the possibility of future experiments or theoretical breakthroughs.

Need to be balanced. Acknowledge the challenges but also the potential. Avoid being too dismissive or overly optimistic. Maybe conclude by saying the future is uncertain but still active in different areas. Check if there are recent developments post-LHC that I should consider, but since the user didn't specify, stick to general points.

Make sure to explain technical terms like "landscape" or "holography" briefly. Keep the language accessible but precise. The user might be someone with a basic understanding of physics, possibly a student or enthusiast. They want to know if string theory is still viable and where it's headed. They might also be interested in how scientific theories adapt when experimental evidence is lacking.

In summary, structure the answer to address the SUSY issue, discuss other aspects of string theory, mention alternative research directions, and conclude with the ongoing relevance despite challenges. Ensure each point flows logically and answers the user's concern about the theory's future post-LHC results." Using the above generated thoughts, model generated a response to the user's query.

The above thoughts represent T in the accompanying FIG. 3. By extracting thoughts generated by a model in their reasoning phase and passing both those thoughts and the initial prompt through a substantially smaller model with less parameters, the same response may be given while using much less energy.

The system supports multiple cache architectures, including but not limited to local device storage for personal use and cloud-based storage for enterprise applications. This allows for knowledge sharing across users while maintaining appropriate privacy and access controls. Multiple specialized caches can exist for different domains or use cases, such as financial analysis or scientific research.

The system supports multiple specialized cache architectures that enable domain-specific knowledge storage and AI agent collaboration. These architectures include but are not limited to local device caches for personal use, edge caches for specific AI agents, and distributed cloud-based caches for enterprise applications. Each specialized cache maintains its own thought organization optimized for its domain—for instance, a financial analysis cache might structure thoughts around market patterns and risk assessment frameworks, while a scientific research cache might organize thoughts based on experimental methodologies and theoretical frameworks. AI agents can be assigned primary affinity to specific specialized caches while maintaining ability to access other caches when needed. For example, a financial analysis agent might primarily interact with the financial cache but could access the scientific research cache when analyzing biotechnology investments. The system implements cache-specific validation rules and quality metrics tailored to each domain's requirements-financial thoughts might require numerical accuracy validation, while scientific thoughts might undergo peer-review-style verification by other AI agents. These specialized caches can operate independently or in interconnected hierarchies, with bridge agents managing thought transfer between different domains. Enterprise deployments can maintain multiple parallel specialized caches with varying access levels, enabling selective knowledge sharing while preserving security boundaries. For instance, a pharmaceutical company might maintain separate but interconnected caches for public research, proprietary development, and regulatory compliance, with AI agents navigating these boundaries based on clearance levels and task requirements.

The system achieves effectively unlimited context windows through a combination of thought abstraction and hierarchical memory management. Rather than attempting to maintain extended token sequences, the system is capable of converting contextual information into thought representations that capture higher-level patterns and relationships. These thoughts serve as compressed encodings of context, where each thought unit may encapsulate understanding that would traditionally require thousands of tokens to represent.

In one embodiment, the system implements a multi-tier thought storage architecture where context exists simultaneously at multiple levels of abstraction. The most recent context maintains detailed thought representations with full fidelity, while older context is progressively synthesized into more abstract thought patterns that capture essential relationships and understanding while reducing storage requirements. This progressive abstraction allows the system to maintain effectively unlimited context while managing computational resources efficiently.

When processing new prompts, router 310 analyzes both recent detailed thoughts and older abstract thoughts to identify relevant context. A thought synthesizer 430 can then combine these different levels of abstraction to generate new thoughts that incorporate both immediate context and long-term understanding. This multi-level synthesis enables the system to maintain contextual coherence across extended interactions without requiring linear scaling of computational resources.

Thought cache 370 implements indexing structures that maintain temporal relationships between thoughts while enabling efficient retrieval based on relevance. Unlike traditional attention mechanisms that must process entire token sequences, the system can directly access relevant thoughts across any temporal distance through its hierarchical indexing system. This capability allows the model to maintain contextual awareness across arbitrarily long sequences while keeping retrieval costs nearly constant.

In one embodiment, thought cache 370 implements multiple storage tiers that automatically organize thoughts based on their temporal relevance and utilization patterns. In its primary tier, the thought cache maintains recent thoughts with their complete reasoning chains and relationship mappings intact. As these thoughts age within the cache, specialized consolidation mechanisms within the cache combine related thoughts into more efficient meta-thoughts that preserve essential reasoning while reducing storage overhead.

Thought cache 370 monitors access patterns and triggers consolidation events when thought clusters meet specific temporal or utilization thresholds. During these events, thought cache 370 analyzes thought clusters using its built-in synthesis capabilities to generate consolidated meta-thoughts. These meta-thoughts capture insights and relationships from the original thought cluster while requiring significantly less storage space. For example, a sequence of thoughts about various machine learning algorithms might consolidate into a meta-thought capturing their comparative advantages and key implementation considerations.

Intelligence within thought cache 370 adapts consolidation timing based on thought utility metrics. Thought cache 370 tracks each thought's retrieval frequency, synthesis participation, and relationship density with other thoughts. Thoughts demonstrating high utility retain their detailed form longer, while less frequently accessed thoughts undergo earlier consolidation. This adaptive approach ensures that frequently needed reasoning patterns remain readily available in their most useful form.

Thought cache's 370 hierarchical storage structure spans multiple performance tiers, from high-speed memory for recent and frequently accessed thoughts to more economical storage for consolidated meta-thoughts. Thought cache 370 may migrate thoughts between these tiers based on usage patterns and age, optimizing storage resource utilization while maintaining rapid access to relevant contextual information. This tiered structure enables the cache to efficiently manage large volumes of thoughts while keeping the most pertinent information readily accessible.

Thought cache 370 implements a universal thought representation format that enables consistent interpretation across different language models and reasoning contexts. This standardization occurs through a formal thought schema that defines how reasoning steps, logical relationships, and contextual dependencies are encoded. Each thought contains structured fields for core reasoning components, metadata describing the thought's context and assumptions, and explicit markers for temporal and logical dependencies. This structured format ensures that thoughts remain interpretable regardless of which model originally generated them or which model ultimately consumes them.

Before a cached thought is applied to a new context, the system may perform an automated compatibility analysis. This analysis examines both the structural alignment between the cached thought and the current context, and the semantic applicability of the reasoning pattern. The system maintains model-specific adapters that can transform thoughts between different models' preferred reasoning styles while preserving the core logical structure. These adapters handle variations in formatting, vocabulary, and reasoning granularity, ensuring smooth thought transfer between models with different characteristics.

The cache incorporates a contextual validation layer that assesses thought applicability before reuse. When retrieving a cached thought, this layer examines the current prompt's context against the thought's encoded assumptions and dependencies. If misalignments are detected, the system can automatically generate bridging thoughts that reconcile differences between the cached reasoning and the current context. For example, if a cached mathematical proof assumes certain preconditions that differ slightly from the current problem, the system generates additional reasoning steps to account for these differences.

The system's thought schema includes explicit version controls and model compatibility markers. These markers identify which model versions and architectures have successfully utilized each thought, enabling the cache to predict compatibility issues before attempting thought reuse. When new model versions are deployed, the system can automatically flag thoughts that may require revalidation or adaptation to maintain compatibility with updated model capabilities or knowledge cutoffs.

Through these standardization and compatibility mechanisms, the thought cache ensures reliable thought transfer across different models and contexts while maintaining the integrity of reasoning patterns. The combination of structured thought representation, contextual validation, and adaptive transformation enables efficient thought reuse while preventing inconsistencies or misinterpretations.

Through this architecture, the system achieves effective unlimited context not through brute-force token retention but through intelligent abstraction and synthesis of understanding. The smaller language model can process these thought-based contexts more efficiently than traditional token sequences, enabling contextual reasoning without the computational overhead typically associated with extended context windows.

The system supports multiple architectural approaches for maintaining extended context through thought processing. While transformer-based attention mechanisms provide one implementation path, the system can alternatively employ recurrent neural networks (RNNs) for processing thought sequences. In an RNN-based implementation, thoughts are processed sequentially, with the network's hidden state maintaining a compressed representation of historical context. This approach enables efficient processing of arbitrary-length thought sequences while maintaining a constant memory footprint, as the hidden state size remains fixed regardless of sequence length.

The system may also implement memory networks for thought storage and retrieval. These networks maintain an explicit, addressable memory that stores thought representations and their relationships. Unlike attention mechanisms that must process all context simultaneously, memory networks can selectively access relevant thoughts through content-based addressing. The memory network architecture enables direct access to specific thoughts based on relevance to the current prompt, without requiring linear scanning of the entire context history.

The thought cache itself can be structured as a differentiable neural memory, where thoughts are stored as embeddings that can be smoothly updated and combined. This approach enables the cache to learn optimal thought storage and retrieval patterns through experience, adapting its organization to maximize the utility of cached thoughts. The differentiable memory structure supports gradient-based optimization of thought storage and retrieval operations, allowing the system to continuously improve its context management efficiency.

Hybrid architectures combining multiple approaches can leverage the strengths of each method. For example, in one embodiment, the system might employ RNNs for sequential thought processing while using a memory network for long-term storage, or combine transformer attention for recent context with compressed RNN states for historical context. These hybrid approaches enable flexible scaling of context processing based on specific application requirements and resource constraints.

Figure 4:
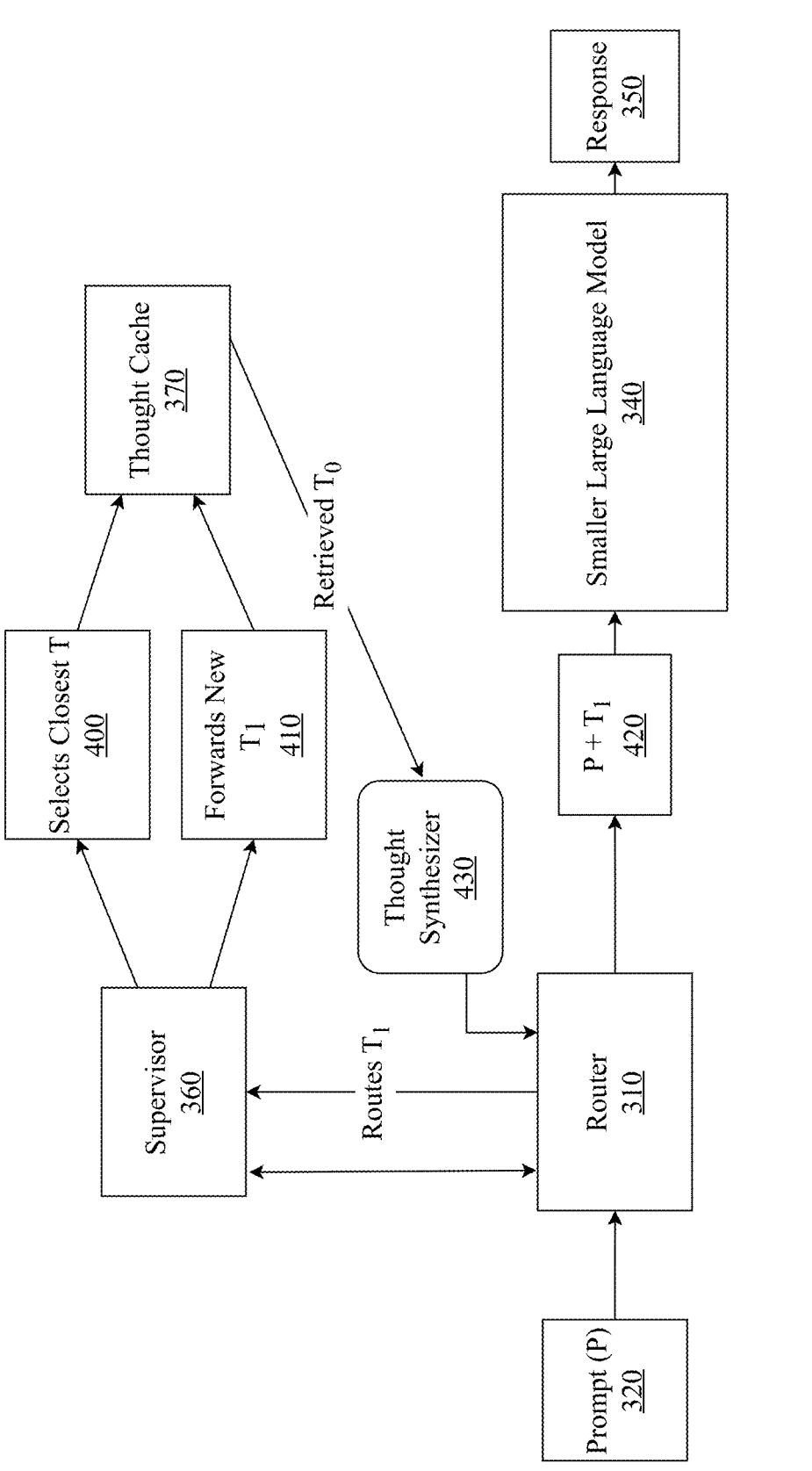
FIG. 4 is a block diagram illustrating an exemplary system architecture for a multi-state LLM with unlimited context with thought synthesis and retrieval.

FIG. 4 is a block diagram illustrating an exemplary system architecture for a multi-state LLM with unlimited context with thought synthesis and retrieval. The figure demonstrates how the system handles scenarios where cached thoughts may be relevant but not precisely matched to the current prompt.

The system begins when a prompt (P) 320 is received by the router 310. When router 310 receives a prompt 320, it interacts with the thought cache 370 through the controller 360 to retrieve potentially relevant thoughts.

The controller 360 performs two key functions in this embodiment. First, it selects the closest thought (To) 400 from the cache that relates to the current prompt. Second, after a synthesizer 430 creates a new thought $T_1$ 410, controller 360 manages the storage of newly synthesized thoughts. The controller evaluates the retrieved To against certain relevance thresholds to determine if synthesis is needed. These thresholds can be configured based on vector similarity scores between the prompt and the cached thought, with different thresholds potentially being set for different domains or use cases. For example, a threshold of 0.8 (on a 0-1 scale) might indicate the thought is relevant enough to use directly, while scores between 0.5-0.8 might trigger synthesis with other related thoughts, and scores below 0.5 might indicate the need to generate entirely new thoughts using the large model. The system can also employ multiple thresholds simultaneously-one for determining if a thought is "close enough" to use directly, another for determining if thoughts are similar enough to be candidates for synthesis, and another for determining if cached thoughts are relevant enough to be considered at all.

The system can assign and append relevance scores and metadata to thoughts in several ways. When a thought (T) is created by the large model, it can be analyzed and scored across multiple dimensions including but not limited to quality assessment metrics, vector embeddings, usage statistics, and domain tags. Quality assessment encompasses the thought's reasoning pattern quality based on its structure and completeness, accuracy scores for verifiable facts, and confidence scores from the model about its conclusions. Vector embeddings can be calculated and stored with each thought, allowing for fast similarity comparisons during cache lookups, with multiple specialized embeddings potentially stored for different aspects like topic, reasoning style, and domain. Usage statistics track metrics such as success rates when the thought is used (including user feedback), frequency of successful reuse, and performance metrics when used with different types of prompts. Domain tags provide additional context through subject matter categorization, specific topic tags, and required expertise level indicators. These scores and metadata can be stored alongside the thought in the cache in a structured format and updated over time based on usage patterns. The comprehensive metadata enables more sophisticated routing and synthesis decisions while allowing the system to improve its thought selection over time through continuous feedback and performance tracking. For instance, a thought might store its general and domain-specific embeddings, various quality and confidence scores, detailed categorization, and usage statistics, all of which can be used to make more informed decisions about when and how to use or synthesize that thought in future operations.

A synthesizer 360 processes $T_0$ to create a new thought $T_1$ that better aligns with the current prompt's requirements. For example, if a prompt asks about specific aspects of quantum computing, and To contains general quantum computing concepts, the synthesizer can create a $T_1$ that focuses more precisely on the specific aspects requested in the prompt.

Thought synthesizer 430 combines and processes thoughts when multiple relevant thoughts are found or when existing thoughts need modification. For example, if one cached thought covers quantum bits and another covers error correction, the synthesizer can combine these into a new thought that addresses quantum computing error rates in qubits. The synthesizer can also adapt existing thoughts to better match current prompt requirements. This synthesis process involves understanding the logical relationships between different thoughts, identifying complementary and conflicting information, and creating coherent combinations that preserve the accuracy and context of the original thoughts. The synthesizer employs various combination strategies depending on the relationship between thoughts— it might perform simple concatenation for complementary thoughts, create hierarchical structures for nested concepts, or generate entirely new bridging content to connect related ideas. Additionally, the synthesizer can evaluate the quality of synthesized thoughts and may generate multiple candidate combinations before selecting the most appropriate one based on relevance scores and coherence metrics.

The synthesizer can work with multiple retrieved thoughts simultaneously, combining relevant aspects from each to create a more comprehensive $T_1$. For instance, if one cached thought contains information about neural networks and another about computer vision, the synthesizer could combine relevant aspects of both to create a new thought more specifically targeted to a prompt about neural networks in computer vision applications.

The system may implement multiple strategies for thought synthesis, enabling the combination of existing cached thoughts to generate new, contextually relevant thoughts without necessarily engaging the large language model. These synthesis mechanisms operate on both the semantic content and vector representations of thoughts, employing various combination strategies depending on the relationship between thoughts and specific prompt requirements. The fundamental approach builds upon vector-based synthesis, where thoughts are represented in a high-dimensional embedding space that preserves semantic relationships through spatial relationships. In one embodiment, when multiple relevant thoughts are retrieved from the cache, their vector representations can be combined through a plurality of mathematical operations to create new thought vectors. These operations may include but are not limited to weighted averaging where more relevant thoughts receive higher weights in the final combination, vector addition with normalization that preserves the directional information of component thoughts, dimensional projection where thoughts are combined along specific semantic dimensions while preserving others, and non-linear combination using learned transformation matrices.

The system demonstrates this vector-based synthesis through concrete applications. For instance, when processing a prompt that requires information about quantum computing's impact on cryptocurrency, and the cache contains separate thoughts about quantum computing ($T_1$) and cryptocurrency security ($T_2$), the system performs a weighted combination expressed as $T\_new = \alpha*T1 + \beta*T2$, where $\alpha$ and $\beta$ represent relevance weights determined by similarity scores between each thought and the prompt. The resulting vector T_new is normalized to maintain consistent magnitude in the embedding space, ensuring that the synthesized thought retains proper proportional representation of its component concepts.

Beyond pure vector operations, the system, in additional embodiments, may employ neural synthesis through a specialized small-scale transformer model trained specifically for thought combination. A neural synthesizer would receive multiple thought vectors as input and generates a new, synthesized thought that captures the relevant aspects of all inputs while maintaining internal consistency. The neural synthesis component is capable of identifying and resolving contradictions between input thoughts, preserving temporal relationships and causal chains, generating bridging content to connect related concepts, and maintaining consistency with the original prompt context. This approach proves particularly valuable when combining thoughts that require subtle understanding of context and implications.

In another embodiment, the system may implement rule-based synthesis through a set of predefined combination patterns based on the logical relationship between thoughts. These patterns support sequential combination for thoughts representing steps in a process, hierarchical combination for thoughts with parent-child relationships, comparative combination for contrasting or parallel thoughts, and supplementary combination for thoughts that provide additional context or examples. The rule-based approach ensures that the structural integrity of thought relationships is preserved during synthesis.

In an embodiment, the system may employ a synthesis quality assessor that evaluates potential thought combinations before they are executed. This assessment examines semantic coherence of the combined thought, preservation of critical information from source thoughts, relevance to the original prompt, and internal consistency of the synthesized thought. The quality assessment process helps prevent the generation and propagation of invalid or inconsistent thought combinations.

In scenarios where multiple synthesis strategies might apply, the system employs a multi-stage synthesis process. This process begins by generating candidate syntheses using different strategies, proceeds to evaluate each candidate using quality metrics, selects the highest-quality synthesis result, and caches the successful synthesis strategy for similar future combinations. This approach ensures optimal synthesis results while building a knowledge base of effective strategies.

The synthesis mechanism supports multiple operation modes including synchronous operation for immediate response requirements, asynchronous operation for background synthesis and cache optimization, and hybrid operation for progressive refinement of synthesized thoughts. This flexibility allows the system to balance response time requirements with synthesis quality needs. Through these synthesis mechanisms, the system can effectively combine and evolve cached thoughts to address new prompts without always requiring the computational overhead of the large language model, while maintaining the quality and relevance of generated responses.

Once $T_1$ is created, it is combined with the original prompt to form $P+T_1$ 420, which is then processed by the smaller language model 340 to generate the final response 350. The newly synthesized $T_1$ is also routed back through the controller for potential caching with thought cache 370, allowing it to be used for future similar prompts.

In one embodiment, thought cache 370 provides performance improvements by eliminating redundant reasoning computations across similar prompts. When 310 router identifies a new prompt with reasoning requirements similar to previously processed queries, thought cache 370 can supply validated thought patterns rather than requiring the large language model to reconstruct the reasoning chain from scratch. This caching mechanism is particularly effective for common analytical patterns, such as mathematical derivations, logical deductions, or standard analytical frameworks that appear frequently across different prompts.

Additionally, thought cache 370 is capable of serving as a quality assurance mechanism by maintaining verified reasoning patterns. Once a thought sequence has been validated and demonstrates consistent success in generating accurate responses, that sequence becomes a trusted template for handling similar queries. For instance, when processing mathematical problems, the cache may contain verified proof structures that can be applied to new problems within the same class, ensuring consistent and reliable solution approaches.

In one embodiment, thought cache 370 implements a validation scoring system that tracks the success rate and reliability of each cached thought. This scoring considers factors such as but not limited to response accuracy, user feedback, and consistency with known truth standards. Thoughts that consistently contribute to high-quality responses receive higher validation scores, making them more likely to be selected for reuse in similar contexts. The cache can also mark certain thoughts as "golden" references when they demonstrate exceptional reliability in specific domains, establishing them as preferred reasoning patterns for their respective problem types.

To prevent the propagation of incorrect reasoning, thought cache 370 may employ a continuous validation mechanism. This mechanism monitors the performance of cached thoughts and can automatically flag patterns that lead to inconsistent or incorrect responses. When potential issues are detected, thought cache 370 may temporarily suspend the use of problematic thoughts and route similar prompts through the large language model for fresh analysis. This self-correction capability ensures that the efficiency benefits of thought caching do not come at the expense of response quality.

Thought cache 370 is capable of supporting selective thought inheritance, where new prompts can partially inherit validated reasoning patterns while allowing for context-specific modifications. This flexibility enables the system to leverage proven reasoning frameworks while adapting them to specific query requirements, combining the benefits of cached reliability with contextual relevance. Through these mechanisms, the thought cache achieves both performance optimization and quality enhancement, delivering faster responses while maintaining or improving the reliability of the system's outputs.

Through this synthesis process, the system can effectively leverage partially relevant cached thoughts to create more precise and relevant thoughts for the current prompt, reducing the need to engage the large language model while still maintaining response quality and relevance.

In another embodiment, thought cache 370 implements security and privacy controls to protect sensitive information while enabling efficient thought reuse. At the storage level, thought cache 370 maintains isolation between user contexts through encrypted partitioning. Each user's thoughts are encrypted with user-specific keys, ensuring that even within shared cache infrastructure, thoughts remain securely compartmentalized. This encryption extends to both the thought content and the associated metadata, preventing unauthorized access to reasoning patterns that might reveal proprietary information.

In the embodiment, thought cache 370 implements a permissions framework that governs thought sharing and reuse. By default, thoughts derived from user interactions are marked private and restricted to the originating user's context. Users can optionally designate specific thoughts for shared use through explicit consent mechanisms. When thoughts are marked for sharing, the cache employs automated sanitization processes that strip personally identifiable information and sensitive data while preserving the underlying reasoning patterns. This sanitization uses advanced pattern recognition to identify and remove context-specific details while maintaining the thought's utility for general reasoning.

To protect against cache poisoning attacks, thought cache 370 may incorporate a multi-stage validation pipeline. Before any thought is cached, it undergoes verification through a separate validation model that assesses its logical consistency and checks for potential malicious patterns. The cache maintains cryptographic checksums of validated thoughts, enabling rapid verification of thought integrity during retrieval operations. Additionally, the cache tracks the provenance of each thought, maintaining secure audit trails of thought creation, modification, and usage patterns.

The system implements graduated access controls that can restrict thought reuse based on security clearance levels, organizational boundaries, or specific sharing agreements. These controls allow enterprises to maintain separate thought caches for different security domains while selectively enabling thought sharing under controlled conditions. For instance, a financial institution might maintain separate caches for public customer service interactions and privileged internal analyses, with strict controls governing any cross-domain thought utilization.

Through these security mechanisms, the thought cache enables efficient reasoning reuse while protecting sensitive information and maintaining system integrity. The combination of encryption, access controls, and validation processes ensures that the performance benefits of thought caching do not compromise security or privacy requirements.

Figure 5:
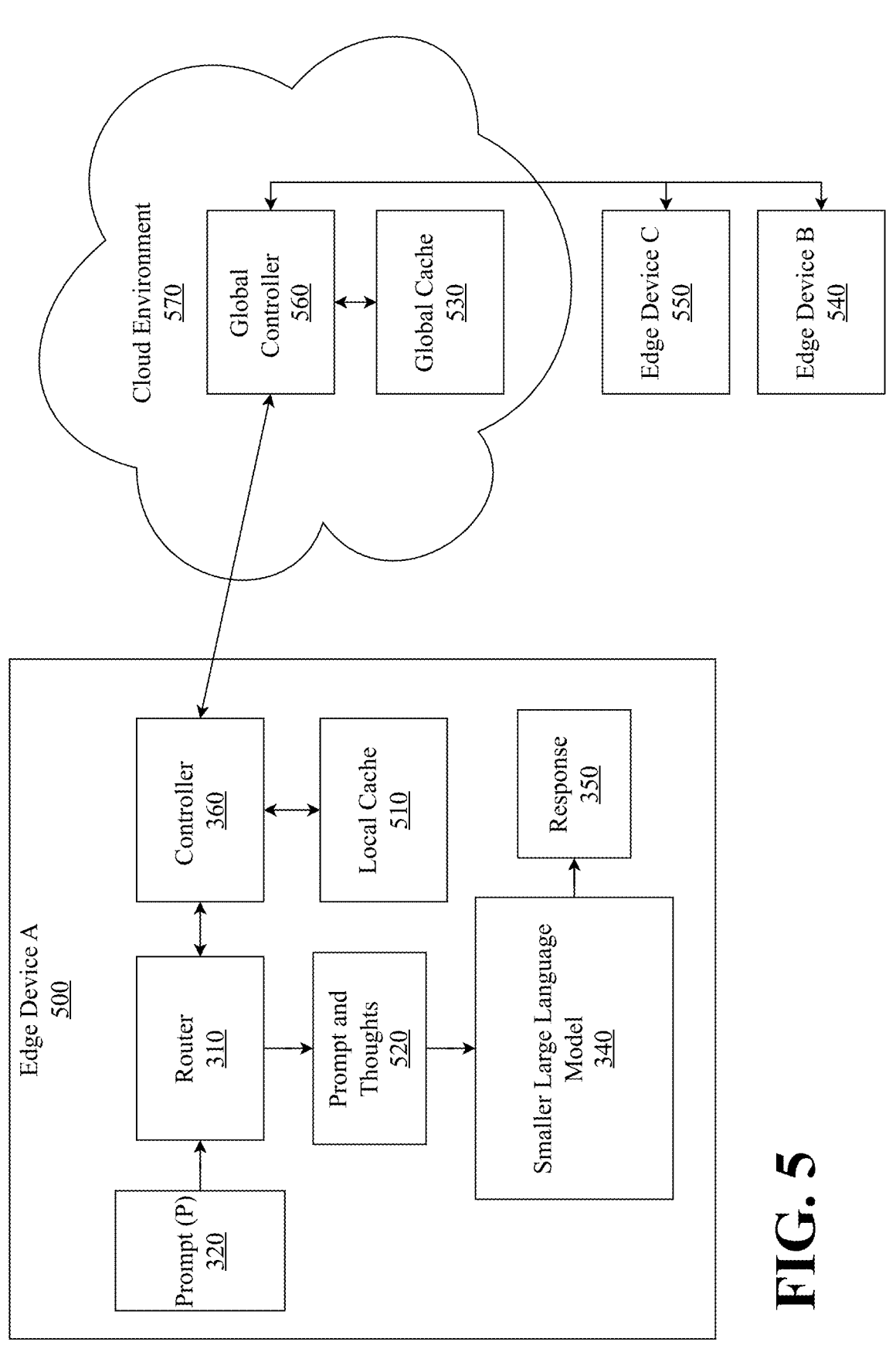
FIG. 5 is a block diagram illustrating an exemplary system architecture for a multi-state LLM with unlimited context with local and global thought caches.

FIG. 5 is a block diagram illustrating an exemplary system architecture for a multi-state LLM with unlimited context with local and global thought caches. This embodiment demonstrates how the system can operate primarily on edge devices while maintaining access to a broader knowledge base through cloud connectivity.

Edge device A 500 represents a complete edge implementation of the system, which could be a device such as but not limited to a mobile phone, tablet, or other personal computing device. Within the edge device 500, router 310 receives prompts (P) 320 and coordinates with a local controller 360 and local cache 510. Local cache 510 stores frequently accessed or personally relevant thoughts directly on the device, enabling quick access and offline functionality.

The smaller language model 340 runs directly on the edge device, processing prompt and thought combinations 520 to generate responses 350. This local processing capability significantly reduces latency and computational requirements compared to constantly accessing cloud resources.

The cloud environment 570 contains a global cache 530 managed by a global controller 560. This global infrastructure serves as a centralized repository for thoughts generated across multiple edge devices (B 540, C 550). The global controller coordinates cache synchronization and manages access patterns across the network of connected devices.

When an edge device's controller 360 cannot find relevant thoughts in its local cache 510, it can query the global controller 560 to search the global cache 530. For example, if a user on edge device A 500 asks a question about a topic they haven't encountered before, the system first checks the local cache 510, then can reach out to the global cache 530 for relevant thoughts.

The system supports bi-directional synchronization, where new thoughts generated on edge devices can be uploaded to the global cache, and frequently accessed global thoughts can be downloaded to local caches. This creates a dynamic knowledge-sharing environment while maintaining efficient local operation.

Through this architecture, the system provides the benefits of edge computing (low latency, offline capability, privacy) while maintaining access to a broader knowledge base through the cloud infrastructure. The distributed nature of the system allows for efficient scaling and knowledge sharing across user communities while minimizing the computational load on individual devices.

Figure 6:
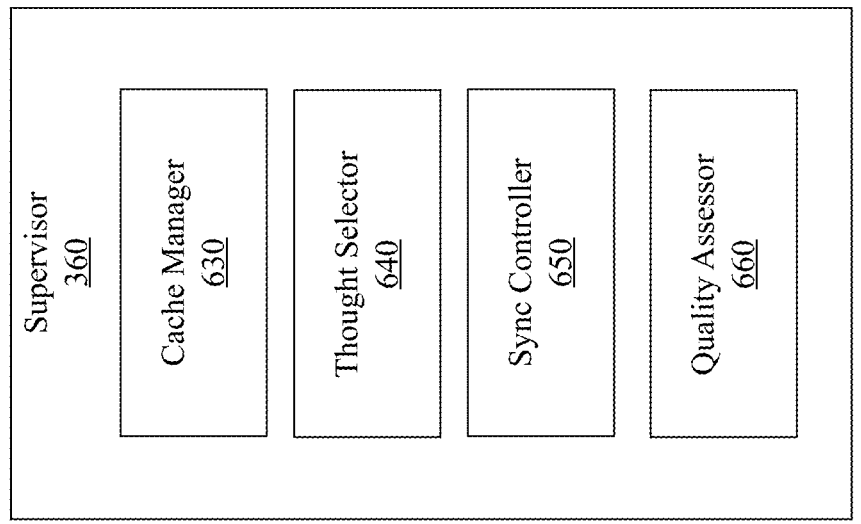
FIG. 6 is a block diagram illustrating exemplary components for a multi-state LLM with unlimited context, a router and a controller.

FIG. 6 is a block diagram illustrating exemplary components for a multi-state LLM with unlimited context, a router and a controller. A prompt analyzer 600 processes incoming prompts to determine their characteristics, domain, and requirements. For example, if a user submits a prompt about quantum computing, the analyzer identifies key technical terms, determines the complexity level, and flags specific concepts that may need specialized thoughts. It also evaluates whether the prompt requires reasoning about multiple concepts (like quantum computing and machine learning) that might benefit from thought synthesis. Analyzer 600 employs natural language processing to break down the prompt into component parts, identifying primary topics, subtopics, relationships between concepts, required depth of knowledge, and any constraints or special requirements specified in the prompt. It can also detect the tone and style of the desired response, technical sophistication level of the user, and whether the prompt requires factual recall, analytical reasoning, or creative synthesis.

A cache query interface 610 serves as the communication bridge between the router and cache systems. It formats prompt analysis results into efficient cache queries and manages the retrieval process. For instance, when searching for thoughts about quantum computing, it might query both technical definition thoughts and practical application thoughts, managing multiple parallel cache requests to both local and global caches. The interface optimizes query patterns based on the analyzer's output, constructing sophisticated search parameters that account for concept hierarchies, semantic relationships, and contextual relevance. It can prioritize different aspects of the query based on importance, manage query timeouts and fallbacks, and handle distributed cache architectures efficiently. The interface also implements caching strategies to optimize frequent queries and manages cache coherence between local and global storage.

A model selector 620 makes intelligent decisions about model utilization based on cache results and prompt analysis. It implements decision logic to determine whether to: use the large model for new thought generation, proceed with cached thoughts through the smaller model, or employ a hybrid approach. For example, if highly relevant thoughts exist in the cache, it might bypass the large model entirely to save computational resources. In one embodiment, model selector 620 employs decision trees and heuristics that consider multiple factors including thought relevance scores, computational resource availability, response time requirements, and quality thresholds. It can dynamically adjust its selection criteria based on system load, cache hit rates, and historical performance metrics. Model selector 620 also maintains statistics about the effectiveness of its decisions to continuously refine its selection strategy and may implement different selection policies based on user preferences or application requirements.

A cache manager 630 handles the organization, storage, and retrieval of thoughts in both local and global caches. It implements indexing strategies for quick thought retrieval and manages cache memory efficiently. For example, it might maintain separate indices for different knowledge domains or implement priority-based storage systems where frequently accessed thoughts are kept in faster memory. Cache manager 630 implements eviction policies to optimize cache utilization, considering factors such as but not limited to thought frequency of use, recency, size, and interdependencies with other cached thoughts. It also handles cache coherence between local and global stores, implements versioning and conflict resolution for distributed caches, and maintains metadata about cache performance and utilization patterns. The manager can dynamically adjust its caching strategies based on usage patterns and system resources, potentially implementing different policies for different types of thoughts or knowledge domains.

A thought selector 640 implements algorithms to identify and select the most relevant thoughts from the cache. It uses similarity metrics and relevance scoring to rank cached thoughts based on their applicability to the current prompt. For instance, when processing a prompt about quantum computing applications in cryptography, it might prioritize thoughts that bridge both quantum and cryptographic concepts. Thought selector 640 may employ multiple ranking algorithms that consider various aspects of thought relevance, including semantic similarity, contextual appropriateness, freshness, and historical success rates. It can perform multi-stage selection processes, first identifying broadly relevant thoughts and then refining the selection based on more specific criteria. The selector also considers relationships between thoughts, potentially selecting groups of related thoughts that together provide comprehensive coverage of the prompt's requirements. It maintains performance metrics about selection accuracy and can adapt its selection criteria based on feedback about the effectiveness of selected thoughts in generating successful responses.

A sync controller 650 manages the complex task of synchronizing thoughts between local and global caches. It implements policies for when to upload local thoughts to the global cache and when to download global thoughts to local storage. For example, it might upload locally generated thoughts about emerging technologies to the global cache while downloading commonly accessed thoughts about fundamental concepts to local storage. Sync controller 650 may employ synchronization strategies that balance network bandwidth usage, storage constraints, and data freshness requirements. It implements conflict resolution mechanisms for handling simultaneous updates, version control for tracking thought evolution, and differential synchronization to minimize data transfer. Sync controller 650 can adapt its sync frequency and policies based on usage patterns, network conditions, and device capabilities. It also maintains detailed synchronization logs and metrics to optimize future sync operations and implements recovery mechanisms for handling failed synchronization attempts. Additionally, sync controller 650 can prioritize synchronization tasks based on thought importance, urgency, and resource availability.

A quality assessor 660 continuously evaluates thought quality and usefulness. It monitors factors such as thought relevance, accuracy, and usage patterns to maintain cache quality. For example, if certain thoughts consistently lead to high-quality responses (as measured by user feedback or other metrics), they might be prioritized for retention and synchronization. Conversely, thoughts that rarely prove useful might be flagged for removal or update. Quality assessor 660 may employ multiple evaluation criteria including syntactic correctness, semantic coherence, factual accuracy, and practical utility. It maintains historical performance metrics for each thought, tracking success rates in different contexts and user satisfaction levels. Quality assessor 660 can detect outdated or inconsistent thoughts, identify redundant thoughts that could be merged, and flag thoughts that may need revision due to changing knowledge or requirements. It implements adaptive quality thresholds that can vary based on thought domain, importance, and usage context. Quality assessor 660 also provides detailed quality reports that can be used to guide cache maintenance operations and thought synthesis decisions, and it can trigger automatic thought improvement processes when quality metrics fall below acceptable thresholds.

FIG. 7 is a flow diagram illustrating an exemplary method for natural language processing using a dual-model approach with thought generation. In a first step 700, the system receives a prompt from a user. This prompt can be any form of natural language input, such as a question, command, or statement. For example, a user might input "Explain how quantum entanglement works and its applications in quantum computing."

In a step 710, the system processes the prompt through a first large language model. This model is the larger of the two models, containing more parameters and greater processing capability. During this step, the prompt is encoded and processed through the model's architecture to begin the reasoning process. Continuing the example, the large model begins analyzing the quantum entanglement prompt to understand its complexity and required knowledge domains.

In a step 720, the first large language model converts the prompt into thoughts. These thoughts represent the model's reasoning process and understanding of the prompt's requirements. For the quantum entanglement example, the model might generate thoughts such as: "Quantum entanglement involves pairs of particles maintaining correlated properties regardless of distance" and "In quantum computing, entanglement enables quantum bits to exist in multiple states simultaneously, increasing computational power."

In a step 730, the system routes both the original prompt and the generated thoughts to a second large language model that has fewer parameters than the first model. This routing process combines the original prompt and the generated thoughts into a structured input format that the smaller model can efficiently process. Using the example, both the quantum entanglement prompt and the theoretical thoughts about quantum mechanics are packaged together and sent to the smaller model.

In a step 740, the system generates a response using the second large language model, utilizing both the original prompt and the thoughts generated by the first model. This smaller model, while having fewer parameters, can generate high-quality responses because it has access to the sophisticated reasoning already performed by the larger model. In the quantum entanglement example, the smaller model can now generate a clear, accurate response by leveraging both the original prompt and the theoretical framework provided by the larger model's thoughts, without needing to independently reason about complex quantum mechanics concepts.

This method enables efficient use of computational resources while maintaining response quality by leveraging the strengths of both models: the sophisticated reasoning capabilities of the larger model and the efficient response generation of the smaller model.

Figure 8:
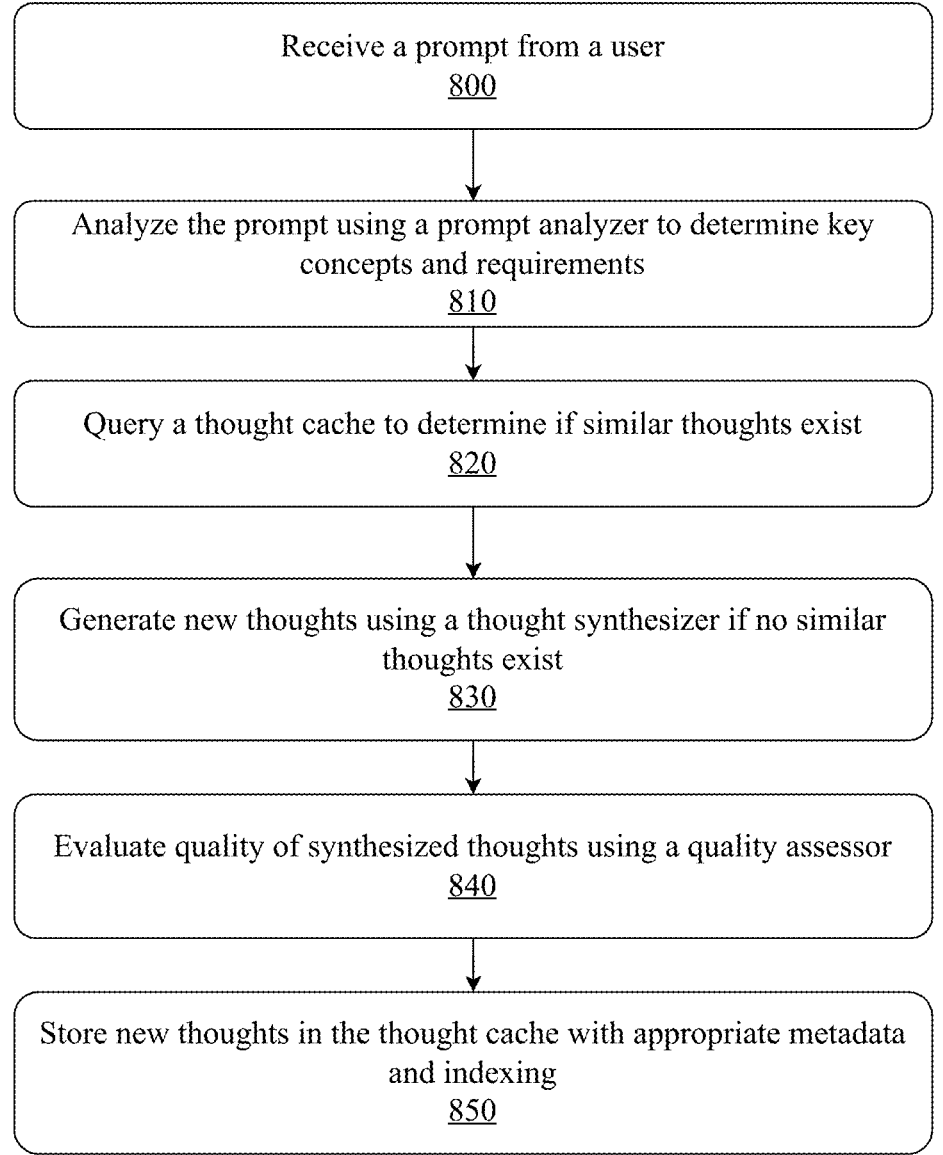
FIG. 8 is a flow diagram illustrating an exemplary method for thought creation, evaluation, and storage within the system.

FIG. 8 is a flow diagram illustrating an exemplary method for thought creation, evaluation, and storage within the system. In a first step 800, the system receives a prompt from a user. This prompt represents any natural language input that requires processing. For example, a user might input "What are the implications of quantum computing on modern cryptography?"

In a step 810, the prompt analyzer processes the input to determine key concepts and requirements. During this step, the analyzer identifies main topics, subtopics, and relationships between concepts. In our example, the analyzer would identify key concepts such as "quantum computing," "cryptography," and their intersection, while also determining the need for forward-looking analysis given the word "implications."

In a step 820, the system queries the thought cache to determine if similar thoughts exist. The query process involves searching both local and potentially global caches for thoughts that match the analyzed concepts. For the example, the system might search for existing thoughts about quantum computing's effects on encryption methods, post-quantum cryptography, or quantum-safe algorithms.

In a step 830, if no similar thoughts exist or existing thoughts aren't sufficiently relevant, the system generates new thoughts using a thought synthesizer. This component may combine fragments of related thoughts or generate entirely new ones. Following the example, if thoughts about quantum computing and modern cryptography exist separately, the synthesizer might combine and adapt them to address their intersection specifically.

In a step 840, the quality assessor evaluates the newly synthesized thoughts. This evaluation considers factors such as relevance, coherence, and completeness. For instance, it would assess whether the synthesized thoughts about quantum computing's cryptographic implications adequately cover both technical and practical aspects of the topic.

In a step 850, the system stores the new thoughts in the cache with appropriate metadata and indexing. This step includes tagging the thoughts with relevant keywords, creating appropriate vector embeddings for future similarity searches, and organizing them within the cache's structure. The thoughts about quantum cryptography might be indexed under both quantum computing and cryptography categories, with metadata indicating their relationship to security, encryption, and future technology implications. This method ensures that the system continuously builds and refines its knowledge base while maintaining quality and accessibility of stored thoughts.

FIG. 9 is a flow diagram illustrating an exemplary method for synchronizing thought caches between local devices and a global cloud environment. In a first step 900, the system initializes a connection between a local device and the cloud environment. This step establishes secure communication channels and verifies authentication credentials. For example, when a user's mobile device connects to the cloud service, it establishes an encrypted connection and validates the device's identity and permissions.

In a step 910, the system identifies new or modified thoughts in the local cache since the last synchronization event. This involves comparing timestamp metadata and modification flags of local thoughts with the last known sync state. For instance, if a user has generated new thoughts about quantum computing on their device while offline, these would be flagged for potential synchronization.

In a step 920, the system evaluates the quality and relevance of local thoughts for global storage. This evaluation considers factors such as thought complexity, uniqueness, and potential value to other users. For example, if a local device has generated highly specialized thoughts about quantum cryptography, the system assesses whether these thoughts would be valuable additions to the global knowledge base.

In a step 930, the system uploads selected local thoughts to the global cache through the sync controller. This step includes formatting the thoughts for global storage and managing the upload process. Continuing the example, the quantum cryptography thoughts would be packaged with appropriate metadata and transferred to the global cache.

In a step 940, the system queries the global cache for new relevant thoughts based on the device profile and usage patterns. This involves analyzing the user's interests and recent activities to identify potentially useful thoughts from the global cache. For instance, if the user frequently works with cryptography-related prompts, the system would search for recent additions to the global cache in this domain.

In a step 950, the system downloads selected global thoughts to the local cache based on relevance and storage capacity. This step optimizes local storage by prioritizing the most relevant thoughts while considering device limitations. For example, the system might download new thoughts about quantum encryption while removing older, less relevant thoughts to maintain optimal cache size.

In a step 960, the system updates synchronization metadata and timestamps for the next sync cycle. This includes recording which thoughts were synchronized, updating version information, and setting markers for the next synchronization event. This information ensures future sync cycles can efficiently identify new changes and maintain cache consistency. This method enables efficient knowledge sharing across a network of devices while maintaining both local and global thought repositories, effectively creating a distributed learning system that benefits from collective user interactions.

Figure 10:
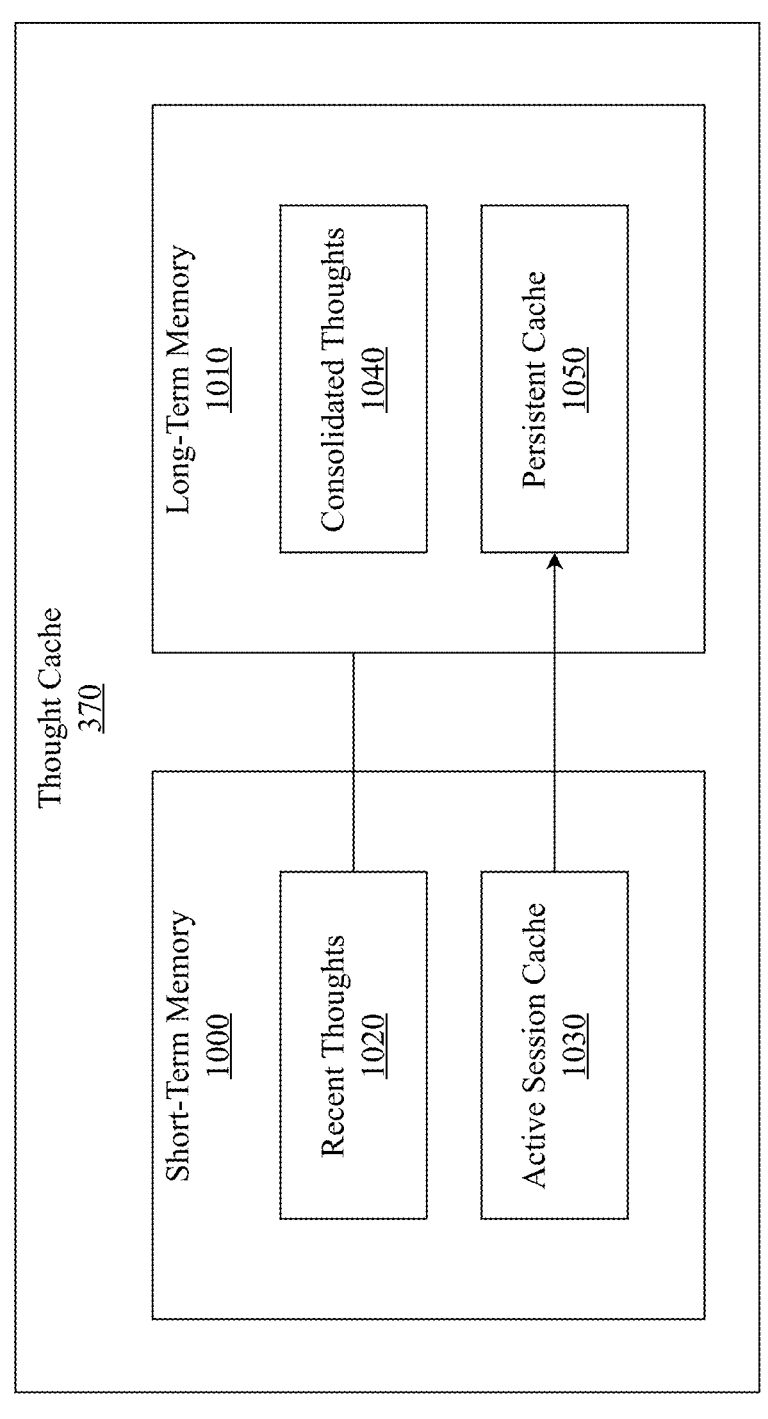
FIG. 10 is a flow diagram illustrating an exemplary system architecture of a thought cache that has both a long-term memory and a short-term memory.

FIG. 10 is a flow diagram illustrating an exemplary system architecture of a thought cache that has both a long-term memory and a short-term memory. In one embodiment, thought cache 370 represents a system for maintaining effectively unlimited context in language models through progressive compression and intelligent caching of thought patterns, enabling shared reasoning across multiple AI instances.

Thought cache 370 implements both a short-term memory 1000 and a long-term memory 1010. This dual-memory architecture enables the system to maintain both immediate computational context and historical reasoning patterns while managing computational resources efficiently.

The short-term memory 1000 comprises recent thoughts 1020 and an active session cache 1030. Recent thoughts 1020 maintain complete thought fidelity, storing both the explicit reasoning chains and the internal model states that generated them. This storage preserves not only the textual representation of thoughts but also the computational context and attention patterns that produced them, enabling precise replication of reasoning processes. The active session cache 1030 provides rapid access to these thoughts and their associated states, optimizing performance for ongoing interactions and enabling immediate thought sharing between different AI instances or specialized reasoning modules operating within the same session.

The long-term memory 1010 implements a more sophisticated storage approach through consolidated thoughts 1040 and a persistent cache 1050. Consolidated thoughts 1040 represent progressively compressed versions of thought patterns, where multiple related thoughts are combined into more compact representations while preserving essential reasoning patterns. This consolidation process employs various compression techniques, including attention-based compression, semantic clustering, and state space reduction. The persistent cache 1050 implements an indexed storage system that enables semantic search and retrieval of these consolidated thoughts, supporting efficient thought sharing across different AI instances and computing sessions.

The system implements bidirectional information flow between these components. Thoughts can move from recent thoughts 1020 to consolidated thoughts 1040 through progressive compression, while the active session cache 1030 can transfer frequently accessed patterns to the persistent cache 1050 for long-term retention. This bidirectional flow enables dynamic thought sharing between different system components and AI instances, supporting collaborative reasoning across multiple agents.

The architecture supports multiple implementation approaches for thought storage and transfer. Thoughts can be stored as chain-of-thought text, internal model states, attention patterns, or hybrid representations combining multiple formats. The system can dynamically select the most appropriate storage format based on the thought's intended use and the capabilities of the AI instances that may access it.

This architectural design enables the thought cache to serve as a central memory system for multiple AI instances, supporting collaborative reasoning while maintaining computational efficiency. The combination of short-term and long-term memory systems, along with progressive compression and flexible thought representation, allows the system to maintain effectively unlimited context while enabling efficient thought sharing across different AI agents and reasoning modules.

Through this architecture, the system achieves both unbounded context maintenance and efficient cross-instance thought sharing, two key innovations that enable more sophisticated and resource-efficient AI reasoning systems. The design's flexibility in implementation approaches and storage formats helps prevent trivial circumvention while enabling broad application across different types of language models and AI systems.

In one embodiment the system implements a collaborative thought sharing architecture that enables multiple AI agents to access and utilize a common thought cache. This shared cache architecture supports distributed reasoning across different types of language models and specialized reasoning modules while maintaining thought consistency and accessibility. When multiple users or AI agents operate within the system, they can all contribute to and benefit from the accumulated reasoning patterns stored in the shared cache.

The shared thought cache maintains a unified index that enables any authorized user or AI agent to access relevant thoughts regardless of which agent originally generated them. This indexing system tracks not only the content of thoughts but also their originating context, generating agent, and successful usage patterns. For example, when a specialized mathematical reasoning module generates a thought containing a proof strategy, that thought becomes available to general language models handling related mathematical queries, enabling them to leverage expert reasoning patterns without duplicating the computational effort.

Thought transfer between specialized reasoning modules occurs through a standardized thought protocol. This protocol defines how thoughts are packaged, transmitted, and unpacked between different types of AI agents. When transferring thoughts, the system includes not just the reasoning content but also relevant metadata such as the thought's context requirements, assumptions, and compatibility markers. For instance, if a natural language processing agent generates insights about sentence structure, these thoughts can be transferred to a grammar checking module in a format that preserves the structural analysis while adapting it to the specialized module's processing requirements.

The system coordinates collaborative reasoning through a central orchestration mechanism. This orchestrator tracks which agents are actively processing related prompts and manages the flow of thoughts between them. When multiple agents encounter similar reasoning requirements, the orchestrator can initiate thought sharing to prevent redundant computation. For example, if one agent has already performed detailed analysis of a complex concept, other agents can build upon that analysis rather than repeating it.

Cross-instance reasoning is enabled through thought synthesis capabilities. When different model instances approach similar problems from different angles, their thoughts can be combined to create more comprehensive understanding. The system tracks the complementary strengths of different model instances and can route thoughts to the most appropriate agent for specific types of reasoning tasks. For instance, a general language model might handle initial prompt analysis, while specialized agents process domain-specific aspects, with their combined thoughts contributing to the final response.

The shared cache implements sophisticated access control and version management to maintain thought integrity across multiple agents. Each thought is versioned to track its evolution as different agents interact with and build upon it. The system maintains provenance information that records how thoughts are transformed and combined through multi-agent collaboration, enabling attribution and quality assessment of collaborative reasoning patterns.

Through these mechanisms, the system enables efficient distribution of reasoning tasks across specialized modules while maintaining coherent thought flow. The collaborative architecture allows different AI agents to contribute their specialized capabilities while benefiting from the collective reasoning capacity of the system. This approach significantly reduces computational redundancy while enabling more sophisticated reasoning through the combination of multiple specialized perspectives.

Evolutionary Agent Colonies with Regenerative Context and Temporal Archaeology

Figure 11:
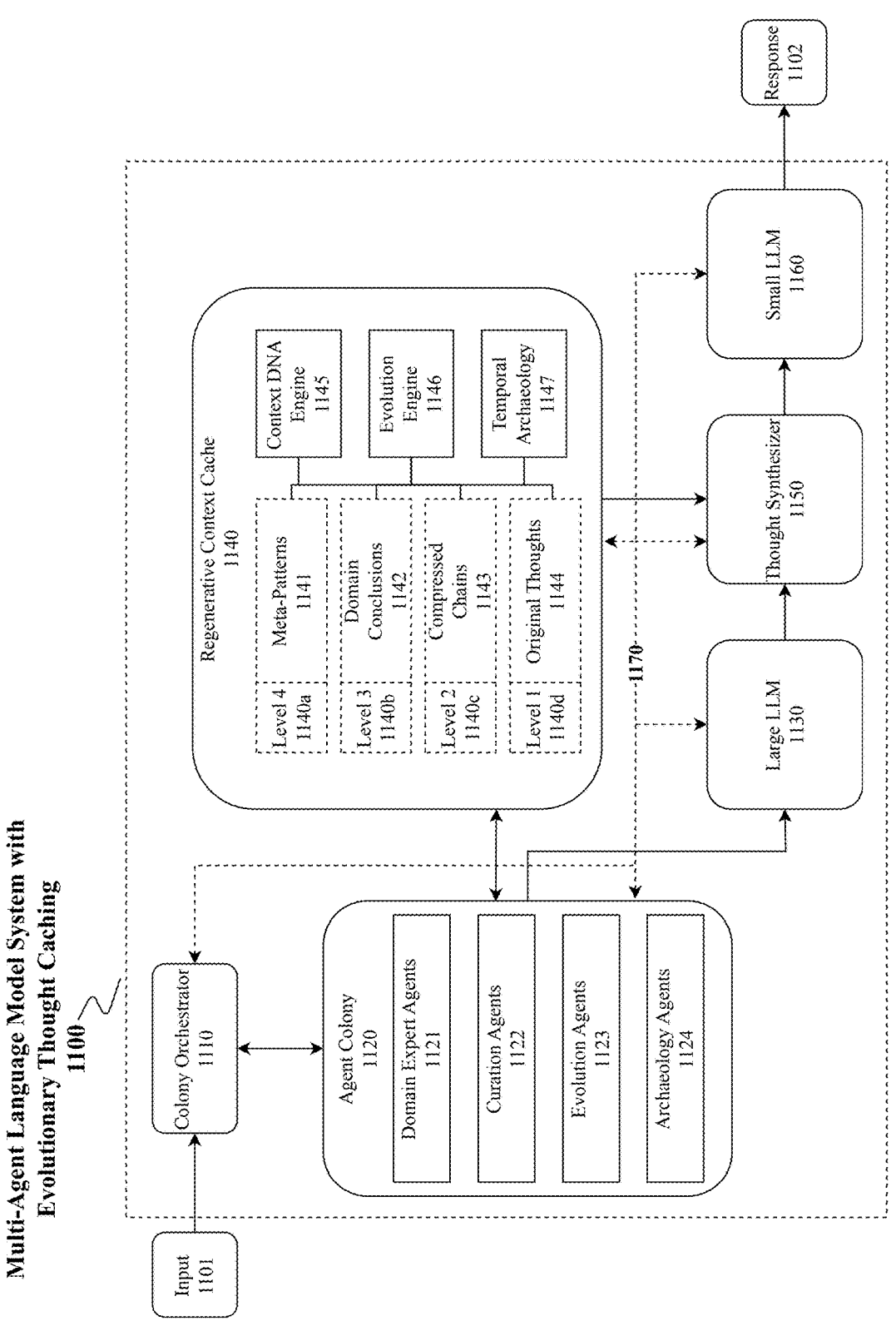
FIG. 11 is a block diagram illustrating an exemplary architecture of a multi-agent language model system with evolutionary thought caching, in an embodiment.

FIG. 11 is a block diagram illustrating an exemplary architecture of a multi-agent language model system with evolutionary thought caching, in an embodiment.

Input data 1101 enters the system and is initially processed by a colony orchestrator 1110. Colony orchestrator 1110 manages agent lifecycle operations, delegates tasks to specialized agents based on domain relevance and load balancing, and implements democratic evaluation protocols for collaborative decision-making. It coordinates agent communication using structured message formats and maintains dynamic state awareness of active agent configurations. Bidirectional communication is maintained between colony orchestrator 1110 and an agent colony 1120 comprising multiple specialized agent types. In some embodiments, colony orchestrator 1110 also receives evaluation results or consensus scores from curation agents 1122 and other specialized agents, enabling coordinated decision-making for thought retention, modification, or rejection based on aggregated quality metrics.

Agent colony 1120 in the present embodiment includes five specialized agent categories. The number and type of agents may vary across embodiments based on task complexity, system configuration, or resource constraints. Domain expert agents 1121 handle subject-specific reasoning tasks in fields such as mathematics, language, science, or logic. Curation agents 1122 evaluate the quality and consistency of generated thoughts using predefined metrics and inter-agent consensus mechanisms. Evolution agents 1123 perform thought evolution operations using genetic algorithms, including crossover and controlled mutation, and contribute to a breeding pool based on fitness scoring. Archaeology agents 1124 analyze historical reasoning patterns, detect recurrent conceptual cycles, and reconstruct compressed contextual information through predictive expansion. Synthesis agents 1125 combine insights across domains to produce integrated or interdisciplinary thought patterns.

From colony orchestrator 1110, processing diverges into two coordinated paths. In one path, a cache check operation queries a regenerative context cache 1140 to identify relevant prior reasoning patterns. In the other, processing is routed to a large language model 1130 when the cache yields no suitable match or when novel thought generation is required. In some embodiments, these paths may execute conditionally or in parallel, based on a similarity threshold or resource availability.

Regenerative context cache 1140 implements a hierarchical memory system organized into four abstraction levels. Meta-patterns 1141 at Level 4 1140a store synthesized cross-domain insights and generalized reasoning frameworks. Domain conclusions 1142 encode analytic outputs specific to defined subject areas at Level 3 1140b. Compressed chains 1143 retain condensed versions of original reasoning sequences, preserving logical flow while reducing memory footprint in Level 2 1140c. Original thoughts 1144 store full-fidelity reasoning patterns with complete contextual information at Level 1 1140d. Transitions between levels are tracked and managed using a context DNA engine 1145, which maintains thought lineage, abstraction history, mutation events, and temporal correlations. An evolution engine 1146 evaluates the fitness of stored thoughts based on historical success rates, semantic utility, and cross-domain adaptability. A temporal archaeology component 1147 reconstructs compressed or abstracted thoughts by detecting historical similarities, leveraging genealogical data, and performing predictive reasoning expansions. In various embodiments, regenerative context cache 1140 may internally implement compression logic, heuristics, or learned models to perform level-specific abstraction based on semantic density and retrieval goals.

Large language model 1130 processes input data when regeneration from cache is insufficient. It performs first-principles reasoning, generating novel thoughts based on embedded knowledge and attention-driven analysis. Whether produced by cache retrieval or new generation, thought content is routed to a thought synthesizer 1150.

Thought synthesizer 1150 performs three core functions. First, it executes multi-agent fusion, which integrates contributions from multiple agents involved in prior reasoning. Second, it performs cross-domain breeding, combining thought fragments from heterogeneous domains to generate hybrid reasoning structures. Third, it executes archaeological reconstruction, expanding partially compressed thoughts into fully reconstituted forms using previously identified semantic and genealogical mappings.

Synthesized thoughts are then provided to a small language model 1160, which generates a final response 1102. The smaller model operates with substantially lower computational requirements than the large language model 1130 and benefits from receiving context-rich, pre-processed reasoning.

An evolution feedback loop 1170 continuously monitors response outcomes, including success metrics such as factual accuracy, user validation (if applicable), and internal consistency. It propagates updates to regenerative context cache 1140 and agent colony 1120, enabling dynamic improvement of stored thoughts and agent performance over time. This feedback mechanism supports a self-improving system architecture that incrementally refines its reasoning strategies through evolutionary pressure and accumulated experience.

The architecture supports both synchronous response generation and asynchronous background processes. In asynchronous mode, thoughts may be evolved, recompressed, or reevaluated even outside the immediate response cycle. Communication within agent colony 1120 occurs via structured protocols that allow agent messages to include payload metadata, sender identification, requested operation types, and target designations. The system leverages both historical context and real-time agent collaboration to optimize reasoning quality and computational efficiency across diverse language processing tasks.

Figure 12:
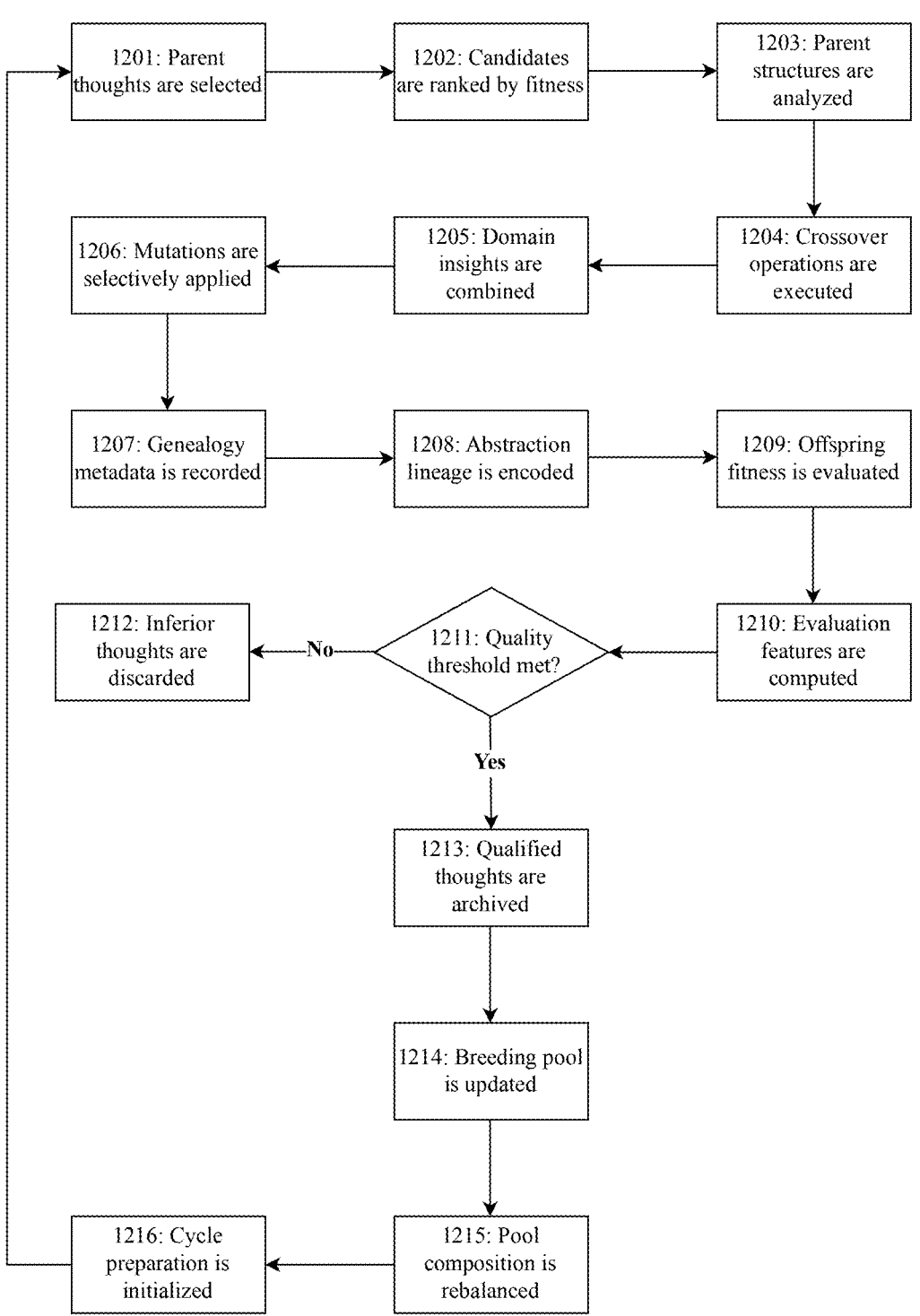
FIG. 12 is a flow diagram illustrating an exemplary evolutionary thought breeding process, including parent selection, crossover operations, mutation, fitness evaluation, and selection for inclusion in the breeding pool, in an embodiment.

FIG. 12 is a flow diagram illustrating exemplary evolutionary thought breeding process of multi-agent language model system with evolutionary thought caching 1100, in an embodiment.

The evolutionary thought breeding process begins when evolution agents 1123 within agent colony 1120 initiate parent selection operations by analyzing cached thoughts stored in regenerative context cache 1140 and evaluating their associated fitness scores maintained by evolution engine 1146 step 1201.

During this parent selection phase, evolution agents 1123 employ tournament selection mechanisms where multiple candidate thoughts compete based on their historical success rates, semantic utility metrics, and cross-domain adaptability scores, with the selection process favoring thoughts that have demonstrated superior performance in previous reasoning tasks while maintaining genetic diversity within the breeding population step 1202.

The selected parent thoughts undergo preparation for crossover operations where evolution agents 1123 examine the structural components of each parent thought including their reasoning chains, domain-specific conclusions, and meta-pattern relationships to identify compatible segments that can be effectively combined step 1203.

Evolution agents 1123 execute crossover operations by implementing uniform crossover techniques that randomly select reasoning components from each parent thought, subtree recombination methods that preserve logical hierarchies while exchanging reasoning branches, and embedding-space interpolation that blends semantic representations to create hybrid reasoning patterns step 1204.

The crossover process specifically targets the combination of thoughts from different knowledge domains stored at various levels within regenerative context cache 1140, enabling the creation of interdisciplinary reasoning patterns that incorporate specialized expertise from domain expert agents 1121 across multiple fields step 1205.

Following successful crossover operations, evolution agents 1123 apply controlled mutation operations that introduce variations through techniques including logical operator substitution, latent dimension reweighting, and novel inference step insertion, with mutation rates dynamically adjusted based on the current diversity levels within the breeding population step 1206. While crossover combines traits from high-performing parents, mutation introduces controlled novelty to prevent convergence on suboptimal reasoning patterns.

Each newly generated offspring thought receives comprehensive genealogy metadata from context DNA engine 1145, which records parent thought identifiers, generation numbers, specific mutation events, crossover locations, and temporal creation markers that enable complete lineage tracking throughout the evolutionary process step 1207.

The genealogy metadata storage process includes encoding abstraction transition paths that document how thoughts have moved between different levels of the hierarchical memory system within regenerative context cache 1140, success correlation patterns with related thoughts, and environmental conditions present during thought creation and initial application step 1208.

Evolution engine 1146 conducts fitness evaluation operations on all offspring thoughts using adaptive fitness functions that consider multiple evaluation criteria including logical consistency, factual accuracy, reasoning efficiency, cross-domain applicability, and temporal relevance step 1209.

The fitness evaluation process incorporates learned models trained to predict downstream success probability, with features including thought complexity metrics, domain alignment scores, historical reuse frequency, processing latency measurements, and consensus scores from curation agents 1122 that have assessed the thought quality step 1210.

Colony orchestrator 1110 coordinates the quality threshold assessment by comparing offspring fitness scores against dynamically adjusted threshold values that account for current system performance requirements, available computational resources, and historical success distributions step 1211.

Thoughts that exceed the predetermined quality thresholds undergo selection for inclusion in the breeding pool archive maintained by evolution engine 1146, where they become available as parent candidates for subsequent evolutionary generations step 1213.

Selected high-quality thoughts are integrated into the breeding pool through archive operations that update thought indexing structures, establish cross-reference relationships with existing archived thoughts, and configure availability flags that enable future parent selection processes step 1214.

Thoughts that fail to meet quality thresholds are discarded through cleanup operations performed by evolution agents 1123, which deallocate associated memory resources, remove temporary genealogy markers, and update population statistics to maintain optimal breeding pool composition step 1212.

The breeding pool update process includes rebalancing operations that ensure adequate representation of different knowledge domains, adjustment of selection probabilities based on recent performance trends, and preparation of the evolutionary environment for the next generation of thought breeding cycles step 1215.

Evolution agents 1123 complete the breeding cycle by updating generation counters, propagating successful mutation strategies to other agents within agent colony 1120, and initializing preparation for subsequent parent selection operations that will utilize the newly archived thoughts step 1216.

This cyclical process forms an evolutionary loop that enables continuous improvement of reasoning patterns across generations.

Figure 13:
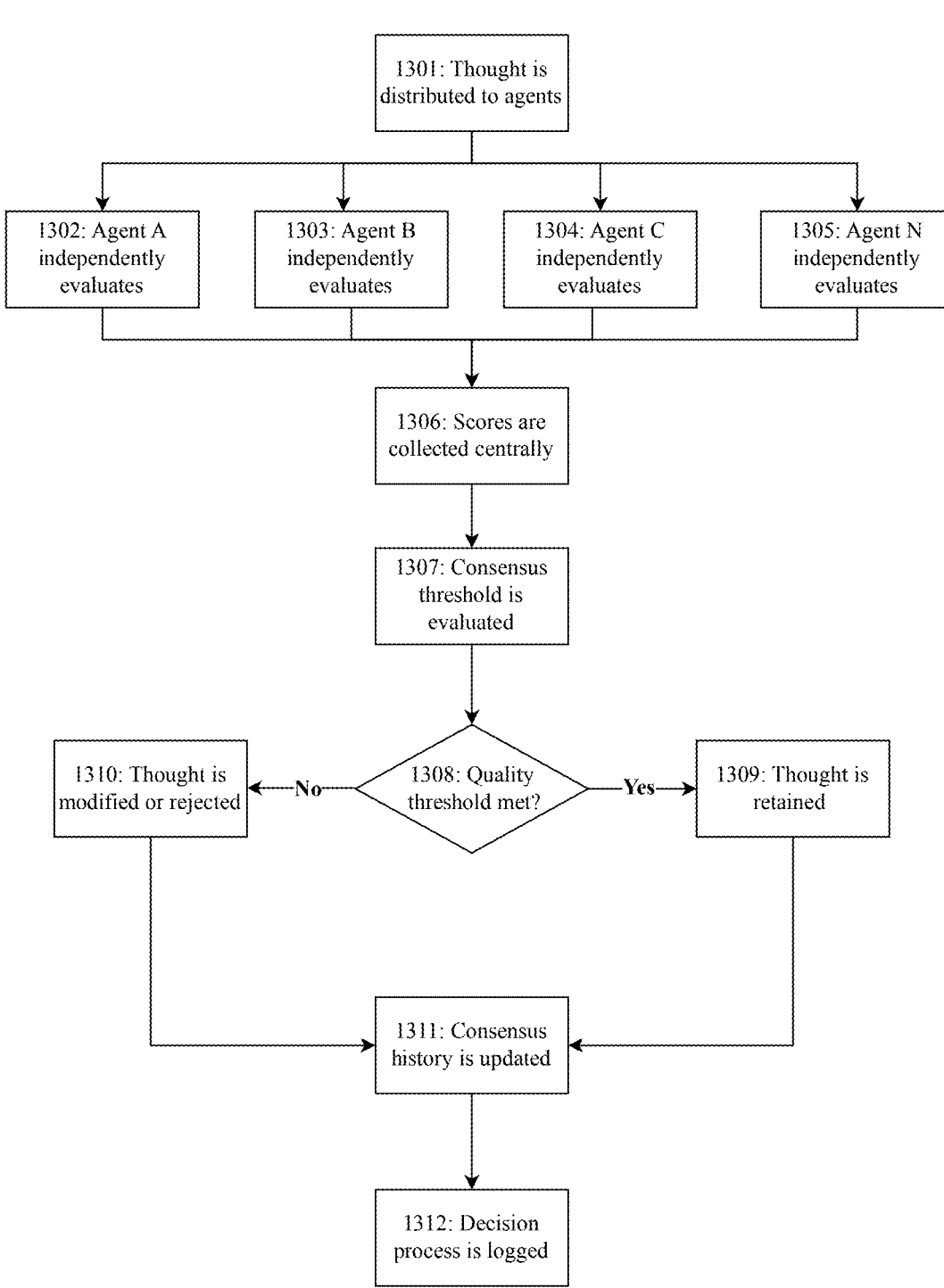
FIG. 13 is a flow diagram illustrating an exemplary democratic agent evaluation process in which curation agents independently assess thought quality, aggregate evaluation scores, and make retention or modification decisions through consensus, in an embodiment.

FIG. 13 is a flow diagram illustrating exemplary democratic agent evaluation process of multi-agent language model system with evolutionary thought caching 1100, in an embodiment.

The democratic agent evaluation process initiates when colony orchestrator 1110 receives a thought requiring quality assessment and distributes this thought simultaneously to multiple curation agents 1122 within agent colony 1120 using structured messaging protocols that include thought payload data, evaluation criteria specifications, and unique assessment identifiers 1301. This process is triggered after a candidate thought has been generated by large language model 1130 or reconstructed from regenerative context cache 1140, and is now subject to democratic quality evaluation by curation agents.

Multiple curation agents 1122 conduct independent assessment operations in parallel, with agent A applying its specialized evaluation criteria to analyze the thought's logical consistency, factual accuracy, semantic coherence, and domain-specific appropriateness without communication or coordination with other participating agents 1302.

Agent B performs its independent assessment by examining the thought's structural components including reasoning chains, conclusion validity, source credibility, and contextual relevance, generating numerical scores across multiple evaluation dimensions while documenting specific strengths and weaknesses identified during the analysis 1303.

Agent C completes its evaluation by applying domain-specific knowledge and assessment frameworks to score the thought across predetermined quality metrics, ensuring coverage of evaluation criteria aligned with its domain specialization 1304.

Agent N and additional curation agents 1122 within the evaluation pool conduct their respective independent assessments using their specialized knowledge domains and evaluation methodologies, with each agent submitting assessment results to colony orchestrator 1110 through standardized response protocols 1305.

Colony orchestrator 1110 performs score collection operations by gathering all evaluation results from participating curation agents 1122, validating the completeness and format consistency of received assessments, and organizing the collected data for subsequent consensus analysis 1306.

Colony orchestrator 1110 executes consensus threshold evaluation by calculating weighted average scores using agent reliability and expertise weights, applying predetermined consensus algorithms that account for individual agent reliability ratings and domain expertise weights, and comparing the aggregated results against dynamically adjusted threshold values 1307.

Colony orchestrator 1110 performs threshold comparison analysis by evaluating whether the calculated consensus score exceeds the predetermined acceptance threshold, considering both the aggregated score margin and the reliability-weighted consensus confidence 1308.

When the consensus threshold is met, colony orchestrator 1110 initiates thought retention procedures by instructing regenerative context cache 1140 to store the validated thought with appropriate quality markers, updating the thought's metadata to reflect successful democratic validation, and marking the thought as available for future retrieval and synthesis operations 1309.

When the consensus threshold is not met, colony orchestrator 1110 triggers thought modification or rejection procedures by flagging the thought for revision, identifying specific areas of concern based on agent feedback, and routing the thought back to evolution agents 1123 for improvement or to disposal processes for permanent removal 1310.

Colony orchestrator 1110 updates agent consensus history by recording the evaluation outcomes, individual agent performance metrics, and agreement patterns, adjusting future agent weighting factors based on their assessment accuracy and reliability demonstrated in the current evaluation cycle 1311.

Colony orchestrator 1110 completes the democratic evaluation cycle by logging the entire decision process including participating agents, individual scores, consensus calculations, and final outcomes in an audit trail maintained for system transparency and performance analysis 1312.

Figure 14:
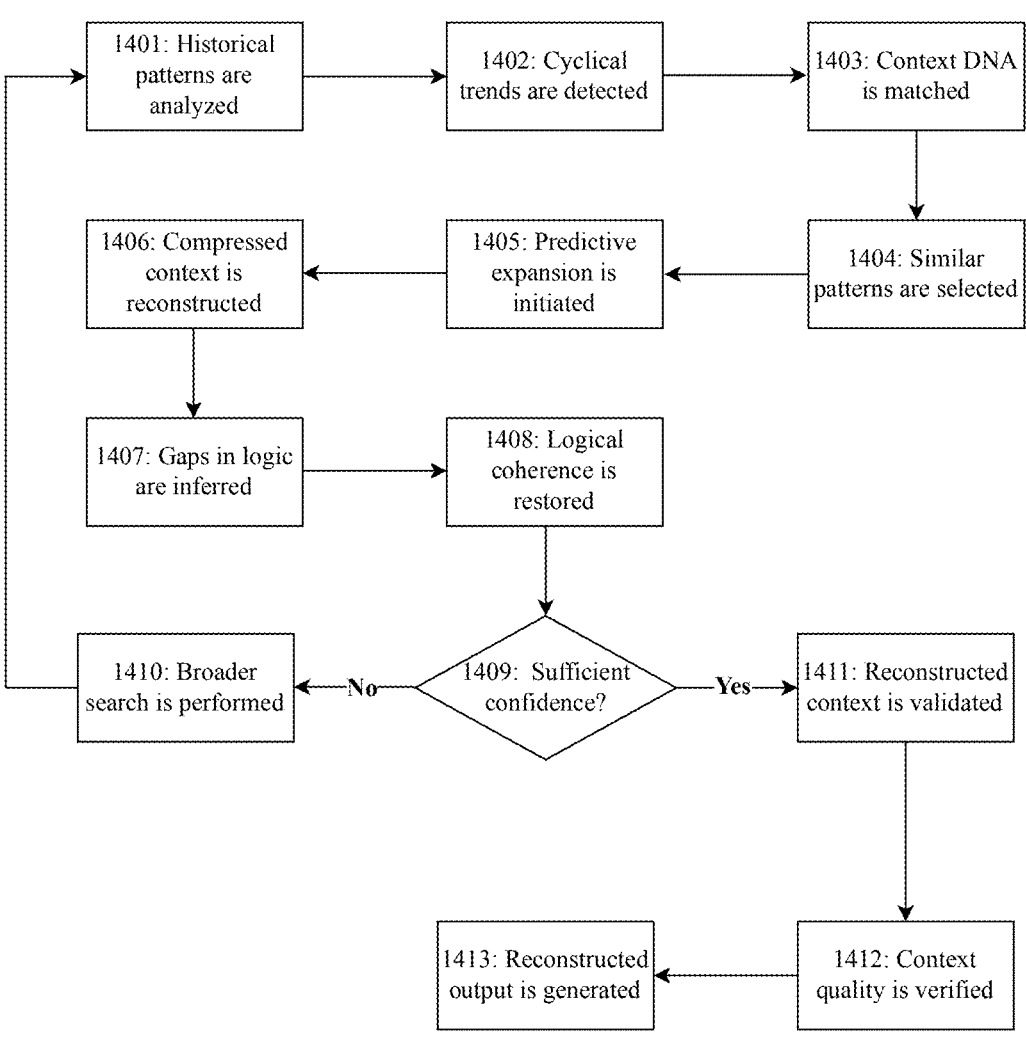
FIG. 14 is a flow diagram illustrating an exemplary temporal archaeology and context reconstruction process, including historical pattern analysis, context DNA matching, predictive expansion, gap inference, and validation of reconstructed thought context, in an embodiment.

FIG. 14 is a flow diagram illustrating exemplary temporal archaeology and context reconstruction process of multi-agent language model system with evolutionary thought caching 1100, in an embodiment.

The temporal archaeology and context reconstruction process begins when archaeology agents 1124 within agent colony 1120 initiate historical pattern analysis by examining cached thoughts stored across multiple abstraction levels within regenerative context cache 1140 to identify recurring reasoning cycles, temporal trends, and evolutionary patterns that have emerged over time 1401.

Archaeology agents 1124 perform comprehensive pattern analysis by applying machine learning models including recurrent neural networks and attention-based temporal models to detect cyclical reasoning patterns, correlate environmental factors with reasoning pattern success rates, and establish baseline understanding of historical thought evolution trajectories 1402.

Context DNA engine 1145 executes context DNA matching operations by comparing genealogical markers and temporal patterns of the target compressed thought against extensive databases of previously successful reconstruction examples, identifying thoughts with similar abstraction paths, mutation histories, and usage contexts 1403.

The context DNA matching process involves traversal of lineage graphs stored in indexed databases, similarity queries based on temporal phase labels and parent thought relationships, and selecting historical patterns that best match the target thought in semantics and structure 1404.

Archaeology agents 1124 implement predictive expansion techniques by applying trained machine learning models to reconstruct detailed contextual information from compressed representations, utilizing identified similar patterns to guide the expansion process and generate probabilistic estimates of missing reasoning elements 1405.

The predictive expansion process incorporates encoder-decoder architectures that have been trained on historical logs of thought evolution, enabling the system to probabilistically recover context details even when original thoughts have been significantly compressed or pruned from their original detailed forms 1406.

Archaeology agents 1124 perform gap inference operations by analyzing the expanded context to identify remaining missing elements, applying archaeological inference algorithms that utilize pattern matching and logical deduction to fill gaps in compressed thought representations 1407.

The gap inference process employs contextual reasoning techniques that examine logical dependencies between reconstructed elements, identify inconsistencies or missing links in the reasoning chain, and generate bridging content that maintains logical coherence while preserving the essential characteristics of the original thought pattern 1408.

Archaeology agents 1124 evaluate reconstruction confidence by assessing the quality and completeness of the expanded context, comparing the reconstructed thought against established coherence metrics and determining whether sufficient confidence levels have been achieved for reliable context reconstruction 1409.

When reconstruction confidence is insufficient, archaeology agents 1124 initiate additional pattern search operations by expanding the scope of historical analysis, examining broader temporal ranges, and incorporating additional similarity criteria to identify more comprehensive reconstruction guidance 1410. The system re-enters earlier steps in the reconstruction pipeline, expanding its search scope until suitable context alignment is achieved.

When reconstruction confidence is sufficient, multiple curation agents 1122 perform cross-agent verification by independently validating the reconstructed context against known facts, logical consistency requirements, and domain-specific accuracy standards 1411.

Curation agents 1122 conduct quality assessment operations by performing comprehensive accuracy checks, coherence validation, and consistency analysis on the reconstructed context to ensure that the archaeological reconstruction process has produced reliable and usable contextual information 1412. Temporal archaeology component 1147 generates reconstructed context output by compiling the verified and quality-assured contextual information into a complete, usable format that preserves the essential reasoning patterns while providing the detailed context necessary for effective thought synthesis and application 1413.

Figure 15:
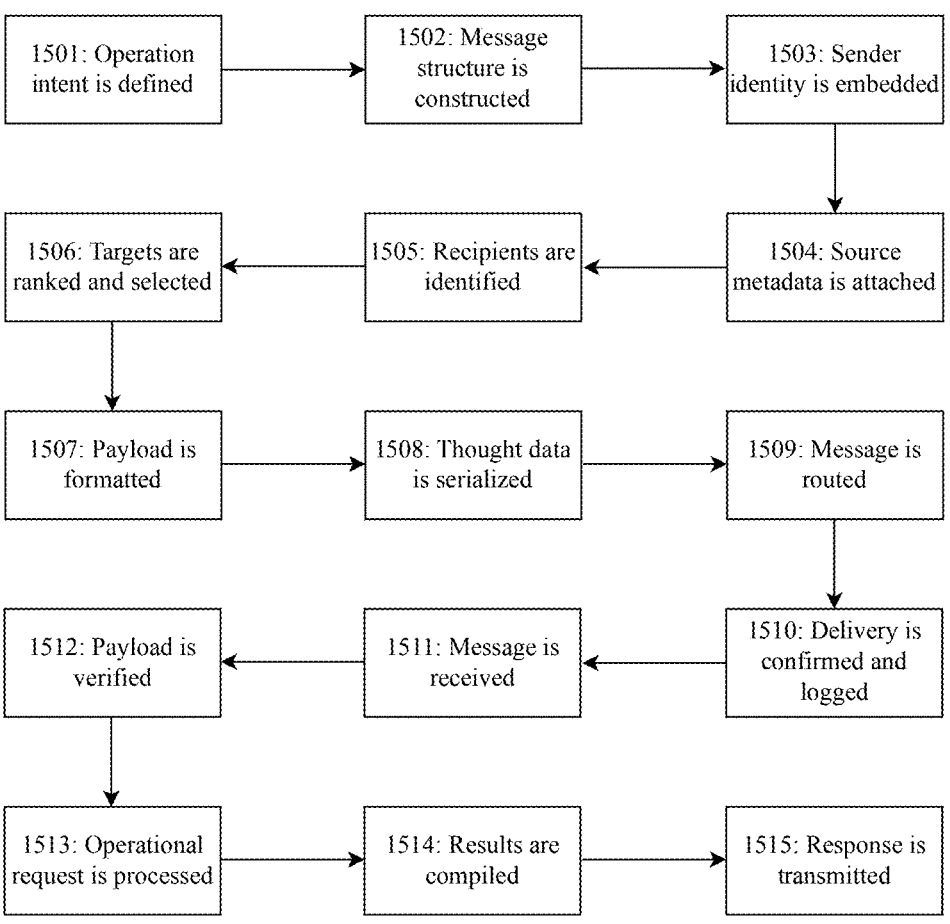
FIG. 15 is a flow diagram illustrating an exemplary agent colony communication protocol, including message creation, sender identification, target specification, payload formatting, transmission, reception, and collaborative response generation, in an embodiment.

FIG. 15 is a flow diagram illustrating exemplary agent colony communication protocol of multi-agent language model system with evolutionary thought caching 1100, in an embodiment.

The agent colony communication protocol initiates when any specialized agent within agent colony 1120 determines the need to communicate with other agents and begins message creation by defining the specific operation type such as evaluation request, synthesis collaboration, or data sharing, along with identifying the content and context requirements for the intended communication 1501.

The initiating agent performs comprehensive message creation by analyzing the operational requirements, determining the appropriate message format based on the requested collaboration type, and establishing the foundational structure that will guide subsequent communication protocol s 1502.

The sending agent executes sender identification procedures by embedding its unique agent identifier, current operational status, authentication credentials, and relevant metadata that enables recipient agents to verify the message source and establish appropriate response protocols 1503.

The sender identification process includes generation of cryptographic signatures when required, assignment of message priority levels based on operational urgency, and inclusion of sender capability information that helps recipient agents understand the context and expertise level of the originating communication 1504.

Colony orchestrator 1110 coordinates target specification operations by analyzing the message content and operational requirements to identify appropriate recipient agents within agent colony 1120, considering factors such as domain expertise, current workload capacity, and historical collaboration effectiveness 1505.

The target specification process involves querying agent availability databases maintained by colony orchestrator 1110, applying load balancing algorithms to distribute communication efficiently across available agents, and establishing recipient priority rankings based on relevance and capability matching 1506.

The sending agent performs payload formatting by organizing thought data, operational parameters, and metadata into serialized into formats such as JSON, Protobuf, or compressed binary protocols to ensure compatibility across heterogeneous agent implementations 1507.

The payload formatting process includes serialization of complex data structures, compression of large thought representations when necessary, encoding of genealogy information from context DNA engine 1145, and attachment of operational instructions that specify the requested actions or responses 1508.

Colony orchestrator 1110 manages transmission operations by routing the formatted message through established communication channels, implementing delivery confirmation mechanisms, and coordinating message queue management to ensure reliable delivery to all specified recipient agents 1509.

The transmission process utilizes structured messaging protocols that support both synchronous and asynchronous communication patterns, implement retry mechanisms for failed deliveries, and maintain communication logs for system monitoring and debugging purposes 1510.

Recipient agents within agent colony 1120 perform reception operations by receiving incoming messages, validating message integrity through checksum verification and authentication protocols, and parsing message content to extract operational instructions and associated data 1511.

The reception process includes verification of sender credentials, assessment of message priority and urgency levels, and preliminary validation of payload format compliance before proceeding to operational processing 1512.

Recipient agents execute processing operations by analyzing the received operational instructions, accessing relevant cached thoughts from regenerative context cache 1140 when required, and performing the requested collaboration activities such as thought evaluation, synthesis participation, or data analysis 1513.

The processing phase involves application of domain-specific expertise, coordination with other system components as needed, generation of intermediate results and progress indicators, and preparation of response data that addresses the original communication requirements 1514.

Recipient agents complete the communication cycle through response generation by compiling processing results, formatting reply messages using the same structured protocols employed for initial communication, and transmitting responses back to the original sending agent through colony orchestrator 1110 1515. This communication loop enables continuous inter-agent collaboration and dynamic task coordination across the evolving agent colony.

Figure 16:
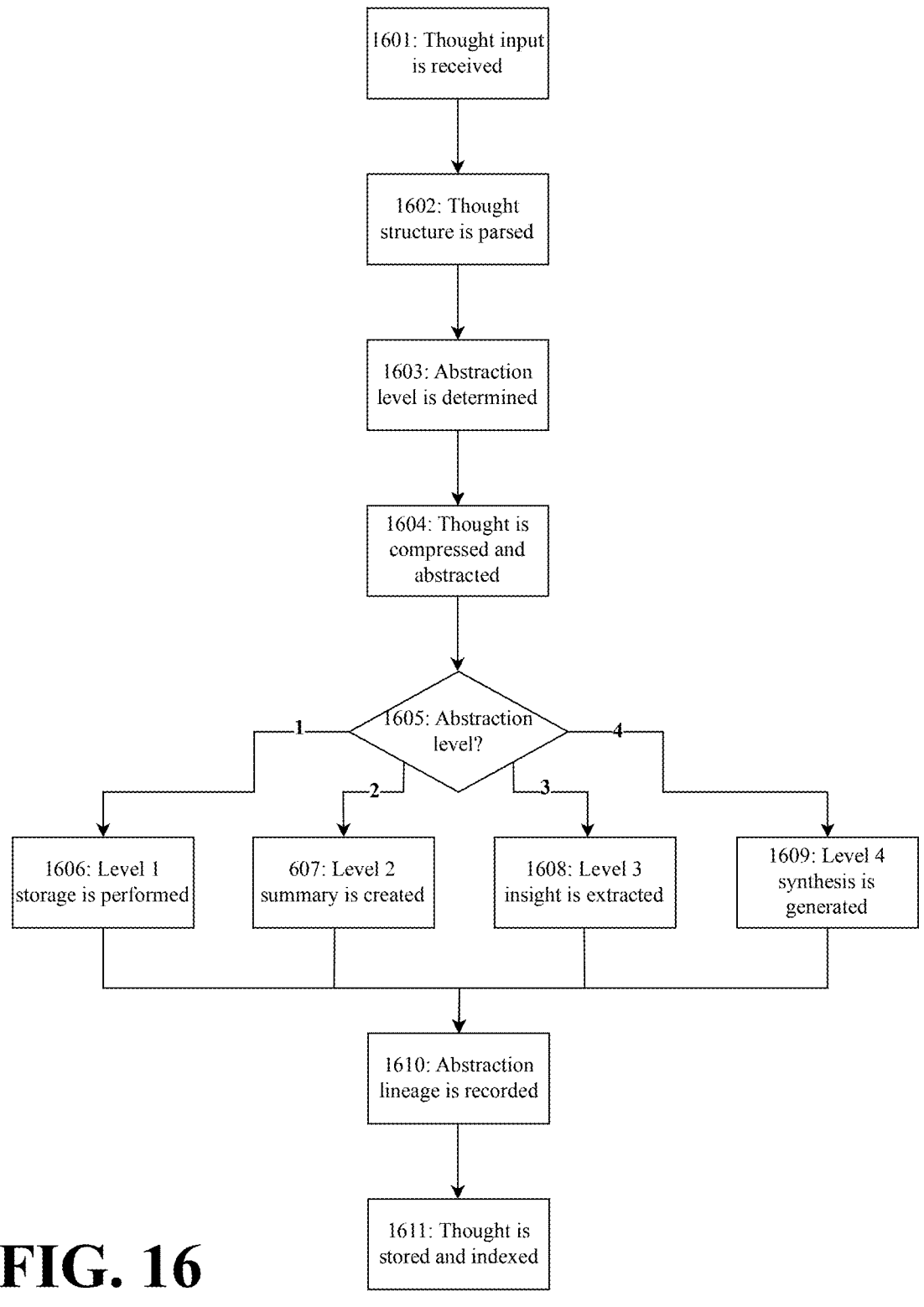
FIG. 16 is a flow diagram illustrating an exemplary multi-level abstraction and compression process, including level determination, semantic compression, abstraction lineage tracking, and hierarchical thought storage across four context levels, in an embodiment.

FIG. 16 is a flow diagram illustrating an exemplary multi-level abstraction and compression process of multi-agent language model system with evolutionary thought caching 1100, in an embodiment.

The multi-level abstraction and compression process begins when regenerative context cache 1140 receives an original thought input containing detailed reasoning chains, complete contextual information, and full-fidelity logical structures that require processing for efficient storage and future retrieval 1601.

The original thought input may be generated by large language model 1130 or retrieved from existing thoughts at lower abstraction levels, and typically includes comprehensive semantic structures, relationship mappings, and contextual dependencies 1602.

Regenerative context cache 1140 analyzes the semantic complexity, domain specificity, and informational density of the input thought to determine the most appropriate abstraction level within the four-tier hierarchical memory system 1603. The level assignment process includes assessment of how much compression can be achieved without loss of essential meaning, evaluation of long-term retrieval and synthesis relevance, and determination of optimal storage format.

Once the target abstraction level is identified, regenerative context cache 1140 performs compression and abstraction operations by applying content-reduction strategies tailored to the selected level, such as logical pruning, semantic clustering, or conceptual summarization, with guidance and lineage tracking support provided by context DNA engine 1145 1604. These operations include identifying critical inference, removing redundancy, abstracting supporting evidence, and generating metadata that describes the abstraction context and fidelity boundaries for future reconstruction guidance.

Following compression, regenerative context cache 1140 routes the thought to the appropriate memory tier based on its assigned abstraction level 1605.

If assigned to level 1, the thought is preserved in its original form with full reasoning chains and contextual integrity intact, supporting high-fidelity immediate reuse 1606.

If assigned to level 2, the thought is compressed into a summary-level representation that retains core logical steps while reducing detail and storage footprint 1607.

If assigned to level 3, the thought is converted into domain-specific conclusions, capturing the key results and implications without retaining intermediate reasoning chains 1608.

If assigned to level 4, the thought is abstracted into high-level synthesis patterns that encode generalized cross-domain insights or meta-reasoning structures 1609.

After abstraction is complete, context DNA engine 1145 records the abstraction transition by updating genealogy metadata with lineage links, abstraction level assignments, and semantic transformation paths 1610. This metadata includes timestamps, transition triggers, and parent-child thought mappings that enable future reconstruction or semantic tracing of thought evolution across levels. In some embodiments, context DNA engine 1145 may monitor abstraction operations in real time to record intermediate transitions, though full lineage registration occurs after final level assignment.

Regenerative context cache 1140 completes the process by storing the abstracted thought at the designated level, updating its internal indexing and retrieval structures, and linking the new thought to related concepts across the hierarchy for integrated access and pattern analysis 1611.

Figure 17:
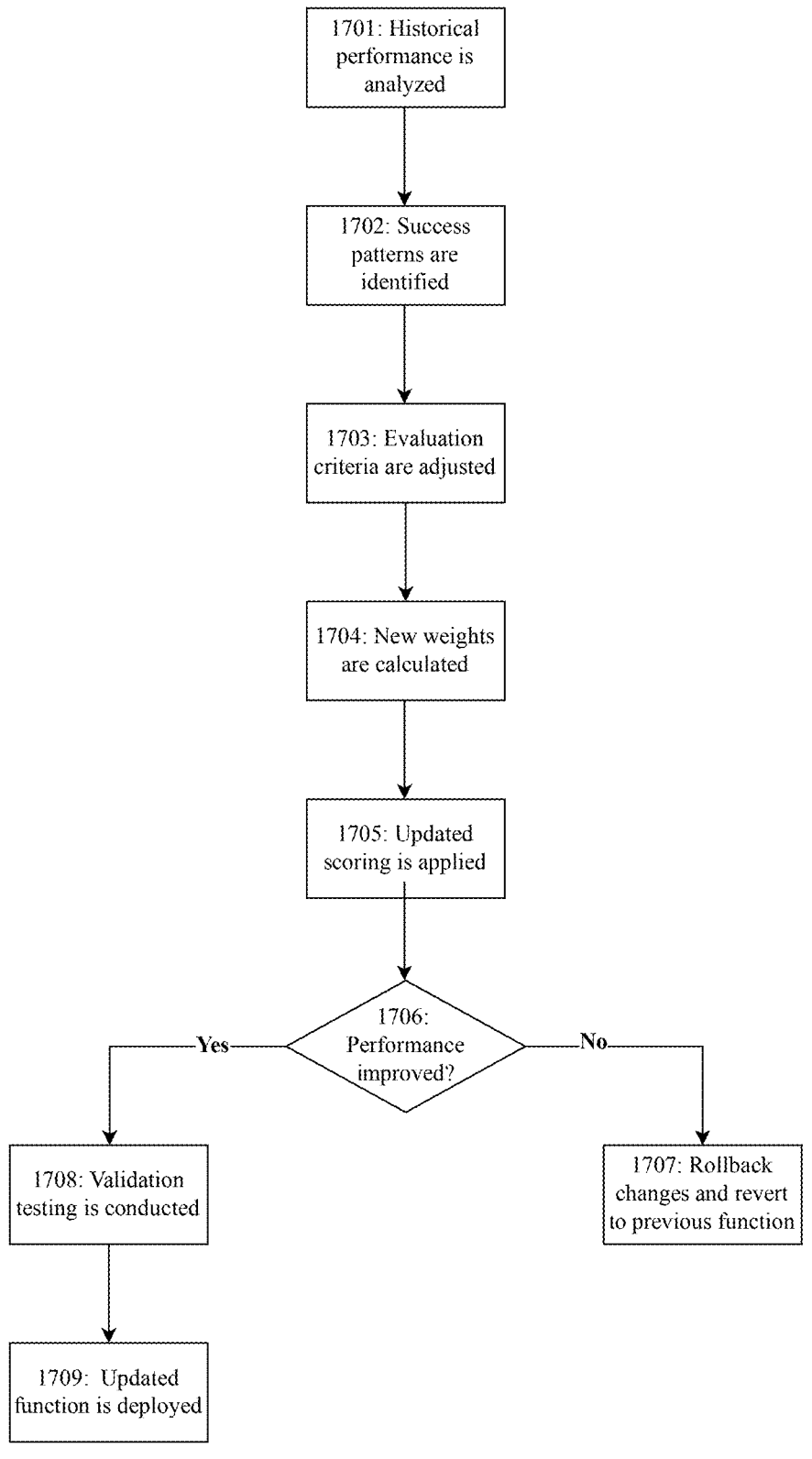
FIG. 17 is a flow diagram illustrating an exemplary adaptive fitness function evolution process, including performance analysis, evaluation criteria adjustment, scoring recalibration, validation testing, and function deployment across the agent colony, in an embodiment.

FIG. 17 is a flow diagram illustrating exemplary adaptive fitness function evolution process of multi-agent language model system with evolutionary thought caching 1100, in an embodiment.

The adaptive fitness function evolution process initiates when evolution engine 1146 begins historical performance analysis by examining comprehensive datasets of previous thought evaluations, correlating fitness scores with actual downstream success metrics, and identifying trends in evaluation accuracy across different temporal contexts and application domains 1701. The historical performance analysis may include examination of thought reuse frequency patterns, assessment of user satisfaction correlations with fitness scores, analysis of cross-domain performance variations, and evaluation of fitness function reliability across different types of reasoning tasks.

Evolution engine 1146 performs success pattern identification by applying statistical analysis techniques and machine learning algorithms to detect correlations between specific fitness criteria and actual thought success outcomes, identifying which evaluation factors most accurately predict thought utility 1702. The success pattern identification process may involve clustering analysis of high-performing thoughts to identify common characteristics, regression analysis to determine the relative importance of different evaluation criteria, temporal analysis to detect changing patterns in thought effectiveness, and cross-validation testing to ensure pattern reliability.

Evolution engine 1146 executes fitness criteria adjustment by modifying evaluation parameters based on identified success patterns, updating the relative weights assigned to different assessment factors, and incorporating new evaluation dimensions that have demonstrated predictive value 1703. The fitness criteria adjustment process may include mathematical optimization of weight distributions, incorporation of newly discovered success indicators, elimination or reduction of criteria that show poor predictive performance, and calibration of evaluation thresholds based on historical effectiveness data.

Evolution engine 1146 calculates new evaluation weights by applying optimization algorithms that balance multiple objective functions, ensuring that the updated fitness function accurately reflects the identified success patterns while maintaining computational efficiency 1704. The new evaluation weights calculation may involve multi-objective optimization considering accuracy, computational cost, and interpretability requirements, normalization procedures to ensure consistent scoring scales, and validation testing using historical data to verify improved predictive performance.

Evolution engine 1146 implements updated fitness scoring by deploying the revised fitness function to evaluate a test set of thoughts, comparing the new scoring results against known success outcomes, and measuring the improvement in predictive accuracy 1705. The updated fitness scoring process may include application of the new function to diverse thought samples, comparison of scoring distributions between old and new functions, statistical significance testing of performance improvements, and analysis of scoring consistency across different knowledge domains.

Evolution engine 1146 performs performance evaluation by comparing the new fitness function results against baseline performance metrics, determining whether the adaptive modifications have produced measurable improvements in thought evaluation accuracy 1706. When performance has not improved sufficiently, evolution engine 1146 initiates rollback changes by reverting to the previous fitness function configuration, preserving the existing evaluation framework, and documenting the attempted modifications for future analysis 1707. When performance improvements are detected, evolution engine 1146 proceeds to validation testing by applying the updated fitness function to additional test datasets, conducting cross-validation experiments, and verifying that improvements are consistent across different evaluation scenarios 1708.

Following successful validation testing, evolution engine 1146 executes deployment of the updated function by implementing the revised fitness evaluation system across all evolution agents 1123 and curation agents 1122 within agent colony 1120, updating system configurations, and monitoring initial performance in live operational contexts step 1709.

Figure 18:
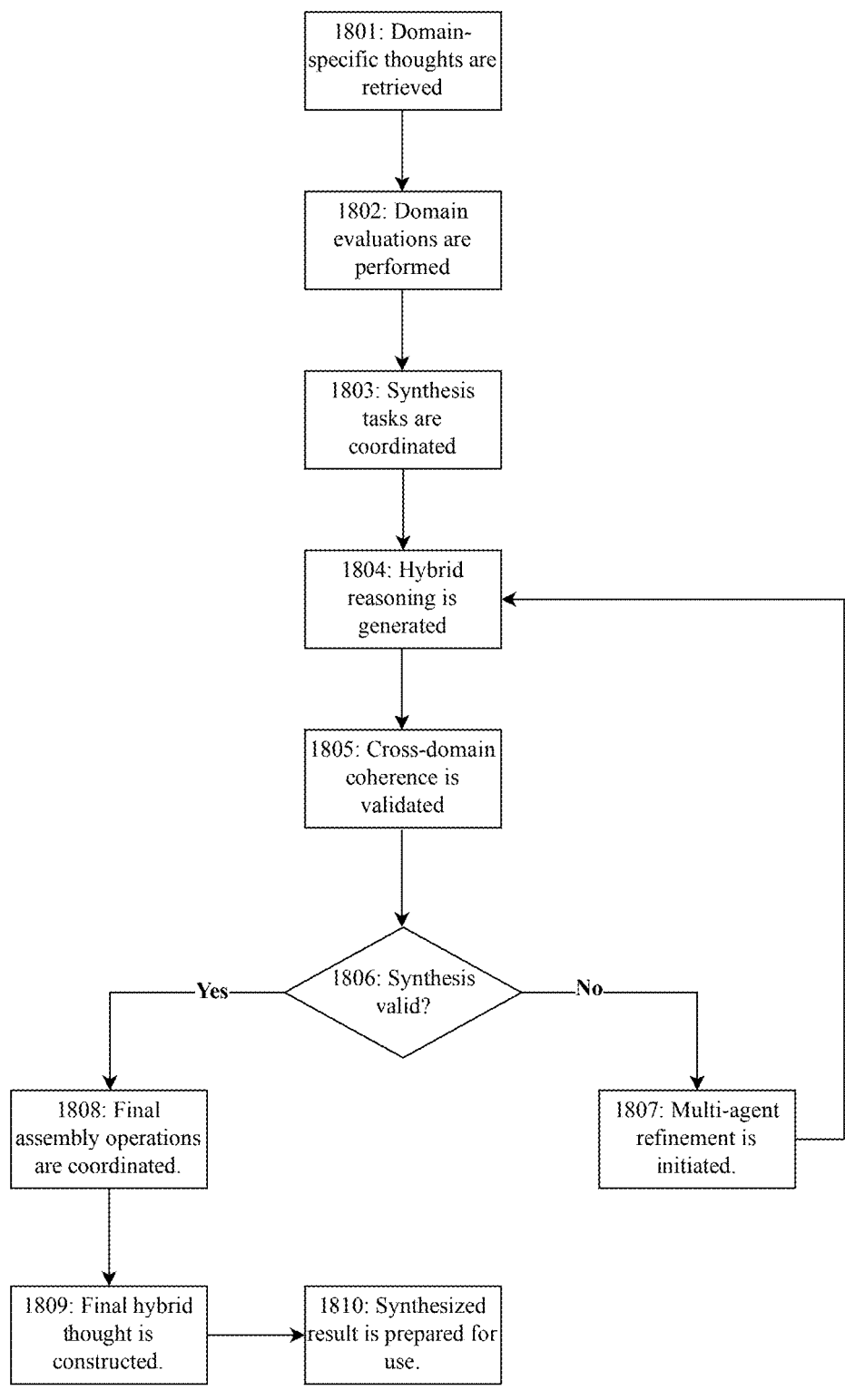
FIG. 18 is a flow diagram illustrating an exemplary cross-domain thought synthesis process, in which thoughts from multiple domains are retrieved, evaluated by domain expert agents, synthesized by synthesis agents, validated by curation agents, and prepared for reuse, in an embodiment.

FIG. 18 is a flow diagram illustrating exemplary cross-domain thought synthesis process of multi-agent language model system with evolutionary thought caching 1100, in an embodiment.

The cross-domain thought synthesis process begins when regenerative context cache 1140 and context DNA engine 1145 perform domain-specific thought retrieval by querying cached thoughts from multiple knowledge domains, identifying relevant reasoning patterns across different specialized areas, and preparing diverse domain thoughts for collaborative evaluation 1801. Multiple domain expert agents 1121 conduct parallel evaluation operations, for example with math expert agents assessing mathematical reasoning components and computational accuracy, science expert agents evaluating empirical validity and theoretical consistency, logic expert agents verifying logical structure and inferential soundness, and language expert agents checking semantic coherence and communication clarity 1802.

Colony orchestrator 1110 performs coordination operations by collecting evaluation results from all participating domain expert agents 1121, analyzing the compatibility assessments and quality scores, and delegating synthesis tasks based on the collective domain expert recommendations 1803. Synthesis agent 1125 executes integration operations by creating cross-domain bridges between different knowledge areas, combining reasoning patterns from multiple domains while preserving their essential characteristics, and generating hybrid reasoning structures that incorporate expertise from specialized domains 1804.

Curation agent 1122 conducts validation operations by assessing the coherence and utility of the synthesized cross-domain result, verifying that the integration maintains logical consistency across all contributing domains, and determining whether the synthesis successfully combines insights from multiple knowledge areas 1805. Colony orchestrator 1110 evaluates synthesis validity by comparing the validation results against established quality thresholds and determining whether the cross-domain synthesis has produced a coherent and useful hybrid reasoning pattern 1806.

When synthesis is not valid, multiple agents within agent colony 1120 initiate multi-agent refinement by collaboratively adjusting the cross-domain bridging mechanisms, with domain expert agents 1121 providing additional guidance and synthesis agents 1125 modifying integration approaches until a valid synthesis is achieved 1807. When synthesis is valid, colony orchestrator 1110 coordinates final assembly operations by integrating the validated cross-domain result into regenerative context cache 1140, routing the synthesized thought to appropriate output channels, and preparing the hybrid knowledge for future retrieval and application 1808.

The system generates a cross-domain synthesized result by producing the final hybrid reasoning pattern that successfully integrates expertise from multiple knowledge domains through collaborative agent processing 1809. The system then prepares the synthesized result for future use by tagging it with abstraction and domain metadata, storing it in regenerative context cache 1140, and making it available for downstream reasoning tasks or response generation 1810.

Figure 19:
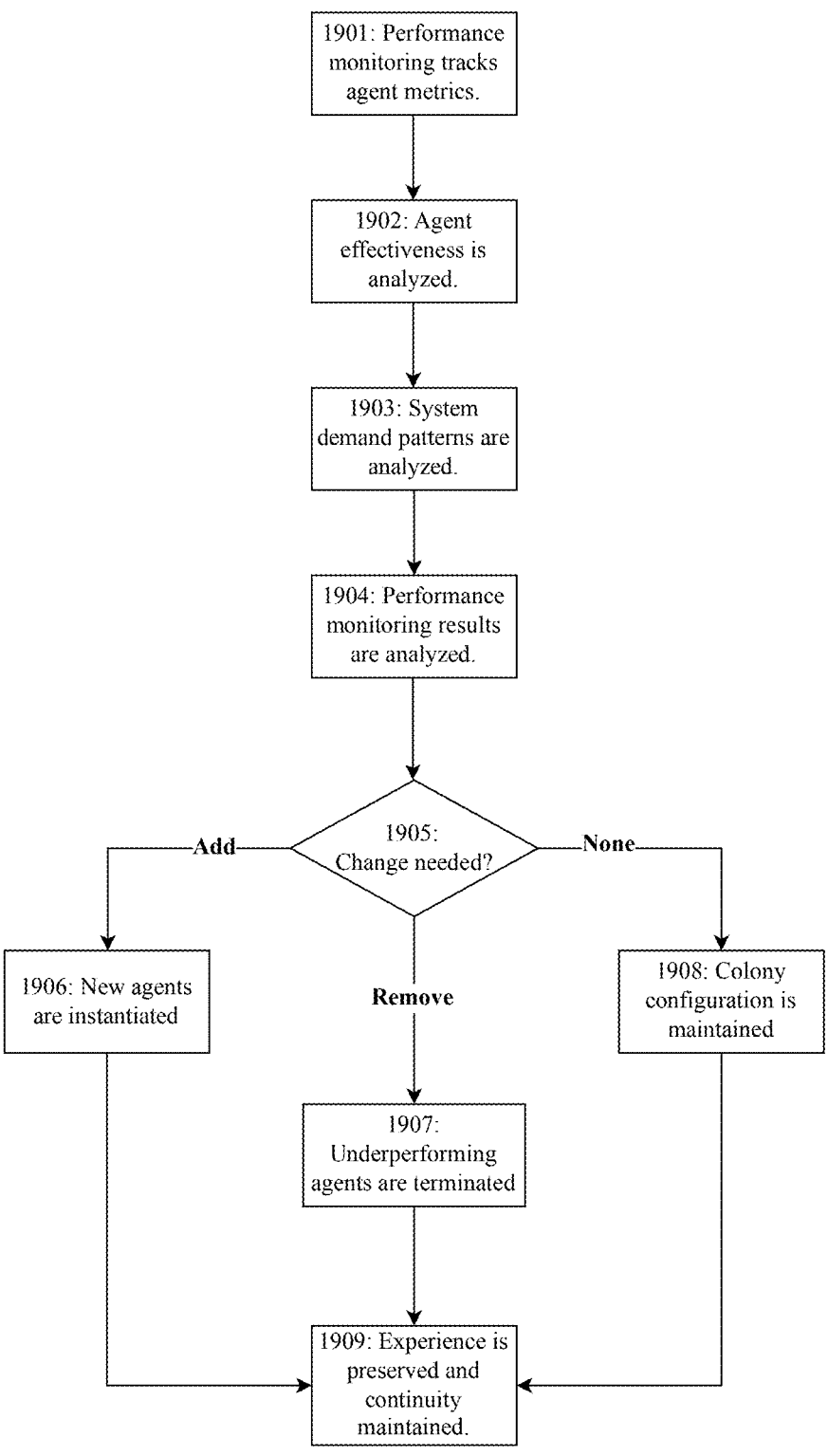
FIG. 19 is a flow diagram illustrating an exemplary dynamic colony management process, including agent performance monitoring, workload assessment, population adjustment, and knowledge transfer to maintain optimal agent colony configuration, in an embodiment.

FIG. 19 is a flow diagram illustrating exemplary dynamic colony management process of multi-agent language model system with evolutionary thought caching 1100, in an embodiment.

The dynamic colony management process begins with performance monitoring operations that continuously track agent metrics across all specialized agents within agent colony 1120, measuring task completion rates, quality scores, collaboration effectiveness, and resource utilization patterns 1901. Agent effectiveness analysis evaluates individual agent performance against established benchmarks, comparing agents within similar specialization categories, and identifying agents that consistently exceed or fall below performance expectations 1902.

Workload assessment operations analyze current system demand patterns, evaluate the distribution of tasks across different agent types, and determine whether the existing agent population adequately meets operational requirements 1903. The colony optimization decision process synthesizes performance monitoring results, agent effectiveness analysis, and workload assessment data to determine what changes, if any, are needed to optimize the agent colony composition and performance 1904.

System evaluation determines whether action is required by comparing current colony performance against optimization targets and assessing if modifications to agent population are necessary to maintain optimal system operation 1905. When additional capacity is needed, agent instantiation procedures create new specialized agents with capabilities derived from successful existing agents, configure them with appropriate domain expertise and operational parameters, and integrate them into the active agent colony 1906. When underperforming agents are identified, agent termination processes remove agents that consistently fail to meet performance standards, deallocate their computational resources, and redistribute their assigned tasks to more effective agents 1907. When current colony composition is optimal, the system maintains the existing configuration without making population changes, continuing to monitor performance while preserving the current agent balance 1908.

Knowledge transfer operations preserve experience and learning from agents that are being terminated, transfer successful patterns and accumulated knowledge to newly instantiated agents, and maintain continuity of expertise within the agent colony 1909.

Hardware Architecture

Figure 20:
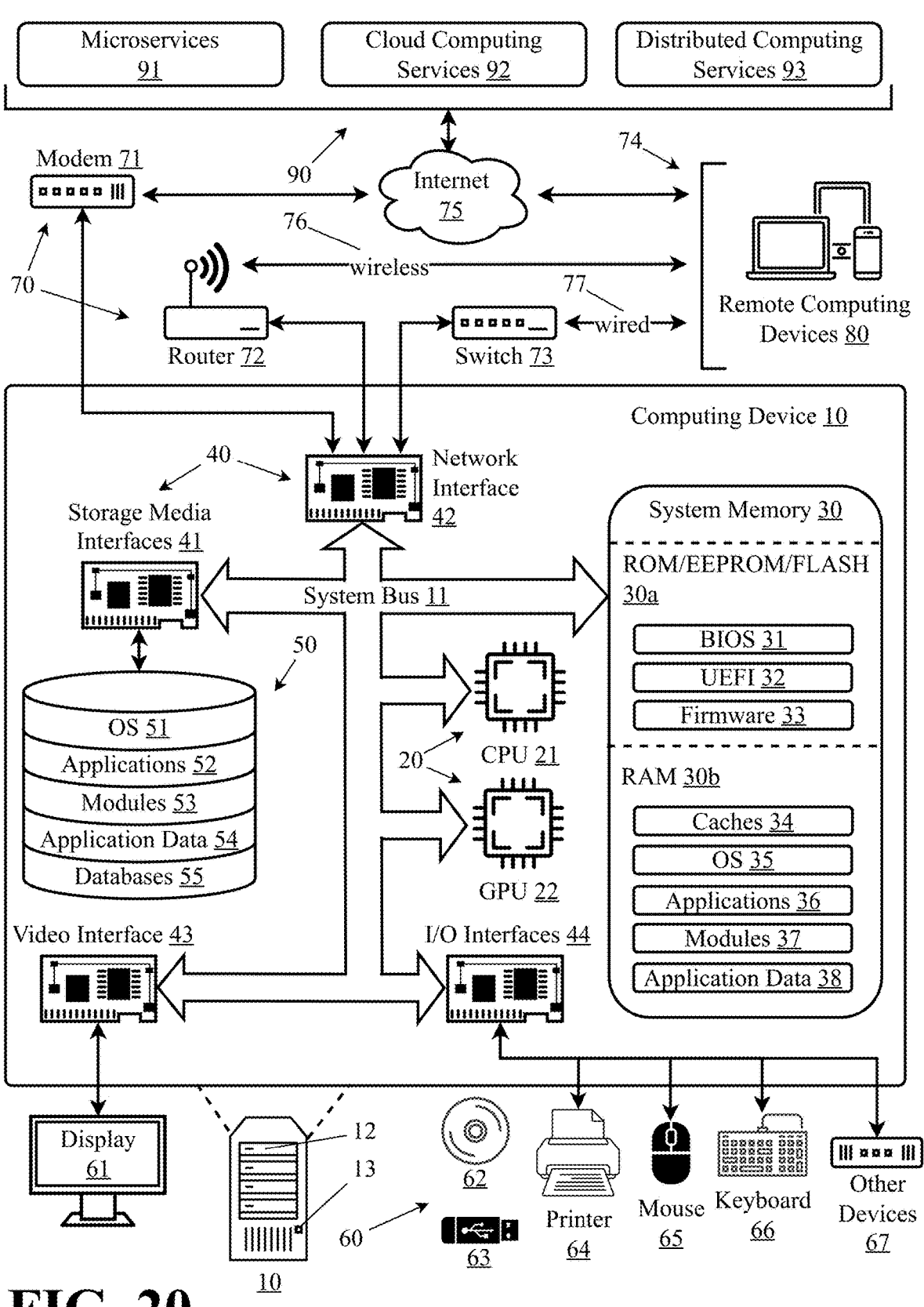
FIG. 20 illustrates an exemplary computing environment on which an embodiment described herein may be implemented.

FIG. 20 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Container provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Federated distributed computing services 93 provide large-scale processing using multiple interconnected computers or nodes to solve computational problems or perform tasks collectively. In federated distributed computing, the processing and storage capabilities of multiple machines are leveraged to work together as a unified system, even when different tiers or tessellations may have limited or even no visibility into the resources and processing layer up or downstream. Federated distributed computing services are designed to address problems that cannot be efficiently solved by a single computer or that require large-scale computational power and require dynamism and workload distribution for economic, security or privacy reasons not well supported by canonical distributed computing resources; e.g. most commonly cloud-based computing applications, resources or analytics. Federated DCG coordinated variants of these services enable superior decentralization and further enhance parallel processing, fault tolerance, and scalability by distributing tasks across multiple tiers or tessellations while enabling computing process dependency calculation with varying degrees of visibility, assurance and privacy or security based on constituent computing system, network, workload and user or provider needs and preferences as well as practical legal and regulatory concerns to include but not limited to data localization, national data transfer restrictions, privacy and consumer protections, wiretap/telecommunications monitoring requirements, encryption and data routing and intermediate processing restrictions.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing 5 device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising a hardware memory, wherein the computer system is configured to execute software instructions stored on nontransitory machine-readable storage media that:

receive input data from a source;

process the input data into a plurality of corresponding thoughts using a first large language model;

associate each corresponding thought with a latent representation of an aspect of the input data;

cache the corresponding thoughts with their associated latent representations in a thought cache;

manage a plurality of specialized agents, wherein each specialized agent is configured to perform domain-specific operations on the cached thoughts;

enable inter-agent communication between the plurality of specialized agents to collaboratively evaluate and modify the cached thoughts;

generate evolved thoughts by combining characteristics from multiple cached thoughts based on evolutionary algorithms executed by the plurality of specialized agents;

retrieve one or more cached thoughts or evolved thoughts based on similarity between a latent representation of newly received input data and the latent representations associated with the cached thoughts;

route both the newly received input data and the retrieved thoughts through a second large language model that has fewer parameters than the first large language model; and generate a response to the newly received input data using the second large language model;

wherein the plurality of specialized agents comprises domain expert agents that handle subject-specific reasoning, curation agents that evaluate thought quality, evolution agents that perform genetic algorithm operations, archaeology agents that analyze historical patterns, and synthesis agents that combine cross-domain insights, and wherein the thought cache implements a multi-level abstraction hierarchy having a base level storing original detailed thoughts, a summary level storing compressed reasoning chains, an insight level storing domain-specific conclusions, and a synthesis level storing high-level meta-patterns.

2. The computer system of claim 1, wherein generating evolved thoughts comprises selecting parent thoughts from the cached thoughts based on fitness scores, then applying crossover operations to combine characteristics from multiple parent thoughts while applying mutation operations to introduce controlled variations, and storing genealogy metadata for each evolved thought that includes parent thought identifiers, generation number, and mutation event history.

3. The computer system of claim 2, wherein each cached thought includes context DNA markers that encode temporal patterns, abstraction transitions, and success correlations, and wherein the fitness scores are determined using adaptive fitness functions that modify evaluation criteria based on historical success patterns and cross-domain performance metrics.

4. The computer system of claim 2, wherein the crossover operations specifically combine thoughts from different knowledge domains to generate hybrid reasoning patterns, and wherein the inter-agent communication utilizes structured messaging protocols that include sender identification, target specification, thought payload with metadata, and collaborative operation requests.

5. The computer system of claim 1, wherein inter-agent communication enables democratic evaluation processes in which thoughts are distributed to multiple curation agents for independent assessment, evaluation scores are collected from the multiple curation agents, and thought retention or modification is determined based on whether aggregated evaluation scores exceed predetermined consensus thresholds.

6. The computer system of claim 1, wherein the archaeology agents are configured to analyze historical patterns in the cached thoughts to identify recurring reasoning cycles, reconstruct compressed historical context using predictive expansion based on the identified patterns, and generate archaeological inferences that fill gaps in compressed thought representations.

7. The computer system of claim 1, further configured to archive successful reasoning patterns from previous agent iterations and transfer knowledge from the archived patterns to newly instantiated agents while monitoring performance metrics of individual specialized agents to dynamically adjust colony composition through modification of agent types and ratios based on performance analysis.

8. The computer system of claim 7, further configured to autonomously optimize system performance by simulating evolutionary pressures through adaptive fitness functions based on current performance requirements while tracking reasoning pattern effectiveness across different temporal contexts and implementing autonomous colony management that adjusts specialized agent allocation based on workload analysis and environmental constraints.

9. The computer system of claim 1, wherein thoughts evolve differently at each abstraction level with operations tailored to semantic granularity, and wherein reconstructing compressed context comprises identifying similar patterns through context DNA matching and applying machine learning models that have been trained on successful reconstruction examples.

10. A method for evolutionary natural language processing with agent colonies, comprising:

receiving input data from a source; processing the input data into a plurality of corresponding thoughts using a first large language model;

associating each corresponding thought with a latent representation of an aspect of the input data; caching the corresponding thoughts with their associated latent representations in a thought cache;

managing a plurality of specialized agents, wherein each specialized agent is configured to perform domain-specific operations on the cached thoughts;

enabling inter-agent communication between the plurality of specialized agents to collaboratively evaluate and modify the cached thoughts;

generating evolved thoughts by combining characteristics from multiple cached thoughts based on evolutionary algorithms executed by the plurality of specialized agents;

retrieving one or more cached thoughts or evolved thoughts based on similarity between a latent representation of newly received input data and the latent representations associated with the cached thoughts;

routing both the newly received input data and the retrieved thoughts through a second large language model that has fewer parameters than the first large language model; and generating a response to the newly received input data using the second large language model;

wherein the plurality of specialized agents comprises domain expert agents that handle subject-specific reasoning, curation agents that evaluate thought quality, evolution agents that perform genetic algorithm operations, archaeology agents that analyze historical patterns, and synthesis agents that combine cross-domain insights, and wherein the thought cache implements a multi-level abstraction hierarchy having a base level storing original detailed thoughts, a summary level storing compressed reasoning chains, an insight level storing domain-specific conclusions, and a synthesis level storing high-level meta-patterns.

11. The method of claim 10, wherein generating evolved thoughts comprises selecting parent thoughts from the cached thoughts based on fitness scores, then applying crossover operations to combine characteristics from multiple parent thoughts while applying mutation operations to introduce controlled variations, and storing genealogy metadata for each evolved thought that includes parent thought identifiers, generation number, and mutation event history.

12. The computer system of claim 11, wherein inter-agent communication enables democratic evaluation processes in which thoughts are distributed to multiple curation agents for independent assessment, evaluation scores are collected from the multiple curation agents, and thought retention or modification is determined based on whether aggregated evaluation scores exceed predetermined consensus thresholds.

13. The computer system of claim 11, wherein the archaeology agents perform steps of analyzing historical patterns in the cached thoughts to identify recurring reasoning cycles, reconstructing compressed historical context using predictive expansion based on the identified patterns, and generating archaeological inferences that fill gaps in compressed thought representations.

14. The method of claim 11, wherein each cached thought includes context DNA markers that encode temporal patterns, abstraction transitions, and success correlations, and wherein the fitness scores are determined using adaptive fitness functions that modify evaluation criteria based on historical success patterns and cross-domain performance metrics.

15. The method of claim 11, wherein the crossover operations specifically combine thoughts from different knowledge domains to generate hybrid reasoning patterns, and wherein the inter-agent communication utilizes structured messaging protocols that include sender identification, target specification, thought payload with metadata, and collaborative operation requests.

16. The computer system of claim 11, further comprising archiving successful reasoning patterns from previous agent iterations and transferring knowledge from the archived patterns to newly instantiated agents while monitoring performance metrics of individual specialized agents to dynamically adjust colony composition through modification of agent types and ratios based on performance analysis.

17. The method of claim 16, further comprising autonomously optimizing system performance by simulating evolutionary pressures through adaptive fitness functions based on current performance requirements while tracking reasoning pattern effectiveness across different temporal contexts and implementing autonomous colony management that adjusts specialized agent allocation based on workload analysis and environmental constraints.

18. The computer system of claim 11, wherein thoughts evolve differently at each abstraction level with operations tailored to semantic granularity, and wherein reconstructing compressed context comprises identifying similar patterns through context DNA matching and applying machine learning models that have been trained on successful reconstruction examples.

* * * * *